United States Patent
Qian

(10) Patent No.: US 12,143,732 B2
(45) Date of Patent: Nov. 12, 2024

(54) IMAGE PROCESSING METHOD AND RELATED ELECTRONIC DEVICE

(71) Applicant: Honor Device Co., Ltd., Shenzhen (CN)

(72) Inventor: Yanlin Qian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/006,183

(22) PCT Filed: Aug. 29, 2022

(86) PCT No.: PCT/CN2022/115486
§ 371 (c)(1),
(2) Date: Jan. 20, 2023

(87) PCT Pub. No.: WO2023/124165
PCT Pub. Date: Jul. 6, 2023

(65) Prior Publication Data
US 2024/0155254 A1    May 9, 2024

(30) Foreign Application Priority Data

Dec. 31, 2021  (CN) .......................... 202111680029.5
Jan. 10, 2022  (CN) .......................... 202210022487.8

(51) Int. Cl.
*H04N 23/88*    (2023.01)
*H04N 23/63*    (2023.01)
*H04N 23/71*    (2023.01)

(52) U.S. Cl.
CPC .......... *H04N 23/88* (2023.01); *H04N 23/631* (2023.01); *H04N 23/71* (2023.01)

(58) Field of Classification Search
CPC ....... H04N 23/64; H04N 23/632; H04N 23/69
See application file for complete search history.

(56) References Cited

U.S. PATENT DOCUMENTS 5,754,682 A * 5/1998 Katoh .................. H04N 1/6052
358/518
6,987,519 B2 * 1/2006 Kumada .............. H04N 1/6088
345/603

(Continued)

FOREIGN PATENT DOCUMENTS

CN    101523888 A    9/2009
CN    107197225 A    9/2017

(Continued)

OTHER PUBLICATIONS

Balasubramaninan, R., et al., "Chapter 5: Device characterization", Digital Color Imaging Handbook, CRC Press, USA, Dec. 23, 2002, 116 pages.

*Primary Examiner* — Abdelaaziz Tissire
(74) *Attorney, Agent, or Firm* — Conley Rose, P.C.

(57) ABSTRACT

An image processing method and a related electronic device. The method includes: starting a camera in response to a first operation; acquiring, by the camera, a first image in response to a second operation; performing first image processing on the first image to obtain a second image in a second color space; obtaining a second parameter based on a first parameter of a first ambient light source, where the first parameter includes a white balance parameter of the first ambient light source, the second parameter is used to identify light source information of the first ambient light source in a third color space, and the third color space is different from the first color space and the second color space; performing second image processing on the second image based on the second parameter to obtain a target image; and storing the target image.

20 Claims, 18 Drawing Sheets

(56) References Cited

U.S. PATENT DOCUMENTS

| | | | |
|---|---|---|---|
| 10,922,846 B2 | 2/2021 | Hu et al. | |
| 2006/0209320 A1* | 9/2006 | Ariga | H04N 1/6058 358/1.9 |
| 2008/0088858 A1* | 4/2008 | Marcu | H04N 1/407 358/1.6 |
| 2008/0252915 A1* | 10/2008 | Jun | H04N 1/603 358/1.9 |
| 2009/0195670 A1* | 8/2009 | Koishi | H04N 1/6083 348/E9.051 |
| 2010/0026837 A1 | 2/2010 | Koishi | |
| 2010/0165137 A1* | 7/2010 | Koishi | H04N 9/67 348/222.1 |
| 2014/0334729 A1 | 11/2014 | Manabe et al. | |
| 2016/0255321 A1 | 9/2016 | Chen et al. | |
| 2019/0132564 A1 | 5/2019 | Wang | |
| 2020/0111447 A1 | 4/2020 | Yaacob et al. | |
| 2020/0404235 A1 | 12/2020 | Moriya | |

FOREIGN PATENT DOCUMENTS

| | | | |
|---|---|---|---|
| CN | 108701365 A | 10/2018 | |
| CN | 107197225 B | 4/2019 | |
| CN | 111899197 A | 11/2020 | |
| CN | 108769973 B | 4/2021 | |
| CN | 113592887 A | 11/2021 | |
| CN | 113810641 A | 12/2021 | |
| CN | 113824913 A | 12/2021 | |
| JP | 2011205275 A | 10/2011 | |

* cited by examiner

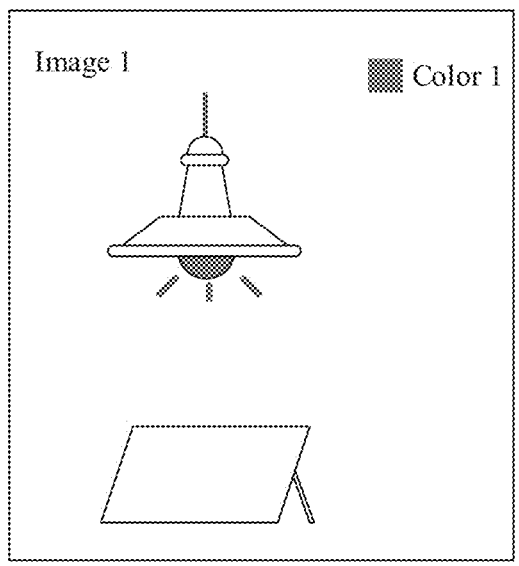
Image obtained only through white balance processing
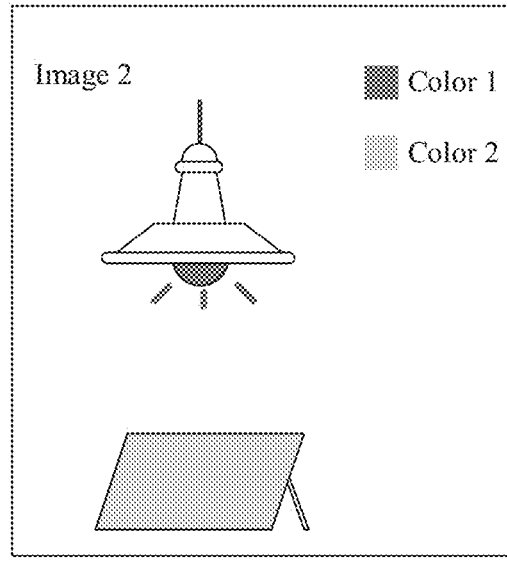
Diagram of a visual effect of human eyes on a photographing environment
FIG. 3D
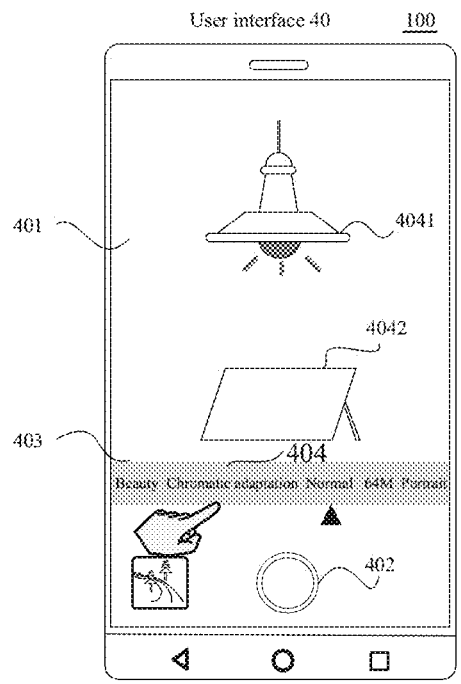
FIG. 4A
FIG. 4B Diagram of a visual effect of human eyes on a
whiteboard in a photographing environment Diagram of a visual effect of human eyes on a whiteboard in a photographing environment

IMAGE PROCESSING METHOD AND RELATED ELECTRONIC DEVICE

CROSS-REFERENCE TO RELATED APPLICATIONS

This application is a U.S. National Stage of International Application No. PCT/CN2022/115486 filed on Aug. 29, 2022, which claims priorities to Chinese Patent Application Ser. No. 202111680029.5, filed with the China National Intellectual Property Administration on Dec. 31, 2021, and Chinese Patent Application Ser. No. 202210022487.8, filed with the China National Intellectual Property Administration on Jan. 10, 2022, all of which are incorporated herein by reference in their entireties.

TECHNICAL FIELD

This application relates to the image processing field, and in particular, to an image processing method and a related electronic device.

BACKGROUND

Human eyes have color constancy. That is, when a color of light irradiating an object surface changes, people's perception of a color of the object surface still remains unchanged. A charge-coupled device (Charge-coupled Device, CCD) circuit or a CMOS circuit for converting an optical signal into an electrical signal in a camera cannot correct a color change of a light source like human eyes do. Therefore, a chromaticity value of a light source of a captured image needs to be estimated by using a white balance algorithm, and an image color needs to be adjusted by using the estimated chromaticity value of the light source, to eliminate impact of a color temperature of a light source in a photographing environment on the image color. A processed image color is not affected by a CCT of the light source in the photographing environment, thereby avoiding image color deviation.

SUMMARY

Embodiments of this application provide an image processing method, to resolve a problem that a color of a photographed object in an image output by an electronic device is different from a color of a photographed object really observed by human eyes in a photographing process.

According to a first aspect, an embodiment of this application provides an image processing method, applied to an electronic device, where the electronic device includes a camera, and the method includes: detecting a first operation; starting, by the electronic device, the camera in response to the first operation; detecting a second operation; acquiring, by the camera, a first image under a first ambient light source in response to the second operation, where the first image is an image in a first color space, and the first ambient light source is at least one ambient light source for acquisition of the first image; performing first image processing on the first image to obtain a second image in a second color space, where the second color space is different from the first color space; performing second image processing on the second image to obtain a target image; and storing the target image, where the performing second image processing on the second image to obtain a target image includes: obtaining a second parameter based on a first parameter of the first ambient light source, where the second parameter is a parameter related to a third color space, the first parameter includes a white balance parameter of the first ambient light source, the second parameter has a correspondence with the first parameter, the second parameter is used to identify light source information of the first ambient light source in the third color space, the third color space is different from the first color space, and the third color space is different from the second color space; and performing second image processing on the second image based on the second parameter to obtain the target image.

In the foregoing embodiment, the electronic device calculates chromaticity information of a light source in a photographing environment by using a white balance algorithm; performs white balance processing and color restoration on an image to obtain a processed image, where the processed image is an image under a reference light source; and converts the image to an LMS color space. Then the electronic device calculates a chromatic adaptation conversion matrix based on the chromaticity information of the light source in the photographing environment and a chromatic adaptation algorithm, and adjusts the image in the LMS color space by using the chromatic adaptation conversion matrix, to obtain a chromatically adapted image close to a visual effect of human eyes.

With reference to the first aspect, in a possible implementation, the first color space is a RAW space, the second color space is an sRGB color space, and the third color space is an LMS color space or an XYZ color space.

With reference to the first aspect, in a possible implementation of the first aspect, the first parameter is an $x_1$ value and a $y_1$ value of the first ambient light source in an xy chromaticity diagram.

With reference to the first aspect, in a possible implementation, the performing first image processing on the first image to obtain a second image in a second color space includes: adjusting the first image based on a formula $$\begin{bmatrix} R'_{1i} \\ G'_{1i} \\ B'_{1i} \end{bmatrix} = \begin{bmatrix} R_{gain} & 0 & 0 \\ 0 & 1 & 0 \\ 0 & 0 & B_{gain} \end{bmatrix} \cdot \begin{bmatrix} R_{1i} \\ G_{1i} \\ B_{1i} \end{bmatrix}$$

to obtain an adjusted first image, where $$\begin{bmatrix} R_{1i} \\ G_{1i} \\ B_{1i} \end{bmatrix}$$

are RGB values of i-th pixel of the first image, $$\begin{bmatrix} R'_{1i} \\ G'_{1i} \\ B'_{1i} \end{bmatrix}$$

are RGB values of the i-th pixel of the adjusted first image, $R_{gain}$=G/R, $B_{gain}$=G/B, and the RGB are RGB values of the first ambient light source in the first color space; and adjusting the adjusted first image based on a formula $$\begin{bmatrix} R_{2i} \\ G_{2i} \\ B_{2i} \end{bmatrix} = CCM \cdot \begin{bmatrix} R'_{1i} \\ G'_{1i} \\ B'_{1i} \end{bmatrix}$$

to obtain the second image, where CCM is a color correction matrix obtained based on the first parameter, and $$\begin{bmatrix} R_{2i} \\ G_{2i} \\ B_{2i} \end{bmatrix}$$

are RGB values of the i-th pixel of the second image in the second color space. In this way, the electronic device can convert the first image in the RAW space into the second image in the sRGB color space (the second color space), so that the electronic device can convert the second image to the LMS color space, and perform chromatic adaptation processing on the image in the LMS color space.

With reference to the first aspect, in a possible implementation, the obtaining a second parameter based on a first parameter of the first ambient light source includes: calculating a degree D of chromatic adaptation based on the first parameter; calculating, based on the first parameter, LMS values of a white point corresponding to the first ambient light source in the third color space; calculating a gain matrix by using a formula $$M_{Gain1} = \begin{bmatrix} L_{dst}/L_{src} & 0 & 0 \\ 0 & M_{dst}/M_{src} & 0 \\ 0 & 0 & S_{dst}/S_{src} \end{bmatrix},$$

where $L_{dst}M_{dst}S_{dst}$ are LMS values of a reference white point in the third color space, a light source corresponding to the reference white point is a reference light source, and the $L_{src}M_{src}S_{src}$ values are the LMS values of the white point corresponding to the first ambient light source in the third color space; calculating LMS values of a target white point in the third color space based on a formula $$\begin{bmatrix} L_{cur} \\ M_{cur} \\ S_{cur} \end{bmatrix} = (D \cdot M_{Gain1} + 1 - D) \times Mcat_1 \times \begin{bmatrix} X_{src} \\ Y_{src} \\ Z_{src} \end{bmatrix},$$

where a light source corresponding to the target white point is a target light source, $$\begin{bmatrix} X_{src} \\ Y_{src} \\ Z_{src} \end{bmatrix}$$

are XYZ values of the white point corresponding to the first ambient light source in the XYZ color space, $$\begin{bmatrix} X_{src} \\ Y_{src} \\ Z_{src} \end{bmatrix}$$

are obtained based on the $L_{src}M_{src}S_{src}$ values, $Mcat_1$ is a conversion matrix for conversion from the XYZ color space to the LMS color space, and $$\begin{bmatrix} L_{cur} \\ M_{cur} \\ S_{cur} \end{bmatrix}$$

are the LMS values of the target white point in the third color space; and calculating the second parameter by using a formula $$CA = \begin{bmatrix} L_{cur}/L_{dst} & 0 & 0 \\ 0 & M_{cur}/M_{dst} & 0 \\ 0 & 0 & S_{cur}/S_{dst} \end{bmatrix},$$

where CA is the second parameter. In this way, after calculating CA, the electronic device can perform chromatic adaptation processing on the image in the LMS color space by using CA, to obtain a Chromatically adapted image consistent with a visual effect of human eyes.

With reference to the first aspect, in a possible implementation, the calculating a degree D of chromatic adaptation based on the first parameter specifically includes: calculating a first variable based on a formula $P_{xy}=\sqrt{(x_1-x_N)^2+(y_1-y_N)^2}$, where $P_{XY}$ is the first variable, $x_N$ is an x value of the reference white point in the xy chromaticity diagram, and $y_N$ is a y value of the reference white point in the xy chromaticity diagram, calculating a second variable based on a formula $D_c=1-e^{-5.3 \cdot P_{xy}}$, where $D_c$ is the second variable; and obtaining the degree D of chromatic adaptation based on a formula $D=0.96 \cdot D_C((1-e^{(-4.28 \cdot log\ La)^{406.5}}-1)+1$, where La is a lighting value of the first ambient light source, in this way, the electronic device can calculate CA by using the degree D of chromatic adaptation, and perform chromatic adaptation processing on the image in the LMS color space by using CA, to obtain a chromatically adapted image consistent with a visual effect of human eyes.

With reference to the first aspect, in a possible implementation, the calculating, based on the first parameter, LMS values of a white point corresponding to the first ambient light source in the third color space specifically includes: calculating a third variable based on a formula $$i_y = \frac{1}{y_1},$$

where $i_y$ is the third variable; calculating XYZ values of the white point corresponding to the first ambient light source in the XYZ color space based on a formula $X_{src}=x_1 \cdot Y_{src} \cdot i_y$ and a formula $Z_{src}Y_{src} \cdot (1-x_1-y_1) \cdot i_y$, where $X_{src}Y_{src}Z_{src}$ are the XYZ values of the white point corresponding to the first ambient light source in the XYZ color space, $Y_{src}=m$, and m is image brightness preset on the electronic device; and calculating LMS values of the white point corresponding to the first ambient light source in the third color space by using a formula $$\begin{bmatrix} L_{src} \\ M_{src} \\ S_{src} \end{bmatrix} = Mcat_1 \cdot \begin{bmatrix} X_{src} \\ Y_{src} \\ Z_{src} \end{bmatrix}, \text{where} \begin{bmatrix} L_{src} \\ M_{src} \\ S_{src} \end{bmatrix}$$

are LMS values of the white point corresponding to the first ambient light source in the third color space, and $Mcat_1$ is a conversion matrix for conversion from the XYZ color space to the LMS color space. This helps the electronic device calculate CA by using the LMS values of the white point corresponding to the first ambient light source in the third color space, and perform chromatic adaptation processing on the image in the LMS color space by using CA, to obtain a chromatically adapted image consistent with a visual effect of human eyes.

With reference to the first aspect, in a possible implementation, the performing second image processing on the second image based on the second parameter to obtain the target image specifically includes: performing third image processing on the second image to obtain a third image; performing chromatic adaptation processing on the third image based on a formula $$\begin{bmatrix} L_{4i} \\ M_{4i} \\ S_{4i} \end{bmatrix} = CA \cdot \begin{bmatrix} L_{3i} \\ M_{3i} \\ S_{3i} \end{bmatrix}$$

to obtain a fourth image, where CA is the second parameter, $$\begin{bmatrix} L_{3i} \\ M_{3i} \\ S_{3i} \end{bmatrix}$$

are LMS values of the third image in the third color space, and $$\begin{bmatrix} L_{4i} \\ M_{4i} \\ S_{4i} \end{bmatrix}$$

are LMS values of the fourth image in the third color space; and performing fourth image processing on the fourth image to obtain the target image. In this way, the electronic device performs chromatic adaptation processing on the image in the LMS color space by using CA, to obtain a chromatically adapted image consistent with a visual effect of human eyes.

With reference to the first aspect, in a possible implementation, the performing third image processing on the second image to obtain a third image specifically includes: converting the second image from the second color space to the XYZ color space based on a formula $$\begin{bmatrix} X_{2i} \\ Y_{2i} \\ Z_{2i} \end{bmatrix} = M_1 \cdot \begin{bmatrix} R_{2i} \\ G_{2i} \\ B_{2i} \end{bmatrix}$$

to obtain a first converted image, where $$\begin{bmatrix} R_{2i} \\ G_{2i} \\ B_{2i} \end{bmatrix}$$

are the RGB values of the i-th pixel of the second image in the second color space, $M_1$ is a conversion matrix for conversion from the second color space to the XYZ color space, and $$\begin{bmatrix} X_{2i} \\ Y_{2i} \\ Z_{2i} \end{bmatrix}$$

are XYZ values of the i-th pixel of the first converted image in the XYZ color space; and converting the first converted image from the XYZ color space to the third color space based on a formula $$\begin{bmatrix} L_{3i} \\ M_{3i} \\ S_{3i} \end{bmatrix} = Mcat_1 \cdot \begin{bmatrix} X_{2i} \\ Y_{2i} \\ Z_{2i} \end{bmatrix}$$

to obtain the third image, where $Mcat_1$ is a conversion matrix for conversion from the XYZ color space to the LMS color space, and $$\begin{bmatrix} L_{3i} \\ M_{3i} \\ S_{3i} \end{bmatrix}$$

are the LMS values of the third image in the third color space. In this way, the electronic device converts the second image from the sRGB color space to the LMS color space.

With reference to the first aspect, in a possible implementation, the performing fourth image processing on the fourth image to obtain the target image specifically includes: converting the fourth image from the third color space to the XYZ color space based on a formula $$\begin{bmatrix} X_{5i} \\ Y_{5i} \\ Z_{5i} \end{bmatrix} = Mcat_2 \cdot \begin{bmatrix} L_{4i} \\ M_{4i} \\ S_{4i} \end{bmatrix}$$

to obtain a second converted image, where $$\begin{bmatrix} X_{5i} \\ Y_{5i} \\ Z_{5i} \end{bmatrix}$$

are XYZ values of the i-th pixel of the second converted image in the XYZ color space, and $Mcat_2$ is a conversion matrix for conversion from the LMS color space to the XYZ color space; converting the second converted image from the XYZ color space to the second color space by using a formula $$\begin{bmatrix} R_{6i} \\ G_{6i} \\ B_{6i} \end{bmatrix} = M_2 \times \begin{bmatrix} X_{5i} \\ Y_{5i} \\ Z_{5i} \end{bmatrix}$$

to obtain a third converted image, where $M_2$ is used to convert the second converted image from the XYZ color space to the second color space, and $$\begin{bmatrix} R_{6i} \\ G_{6i} \\ B_{6i} \end{bmatrix}$$

are RGB values of the i-th pixel of the third converted image in the second color space; performing RGB color space image processing on the third converted image to obtain a fourth converted image; converting the fourth converted image from the second color space to a YUV color space to obtain a fifth converted image; and performing YUV color space processing on the fifth converted image to obtain the target image.

With reference to the first aspect, in a possible implementation, the performing second image processing on the second image based on the second parameter to obtain the target image specifically includes: performing fifth image processing on the second image based on a formula $$\begin{bmatrix} R_{6i} \\ G_{6i} \\ B_{6i} \end{bmatrix} = CA_1 \times \begin{bmatrix} R_{2i} \\ G_{2i} \\ B_{2i} \end{bmatrix}$$

to obtain a third converted image, where $$\begin{bmatrix} R_{6i} \\ G_{6i} \\ B_{6i} \end{bmatrix}$$

are RGB values of the i-th pixel of the third converted image in the second color space, $$\begin{bmatrix} R_{2i} \\ G_{2i} \\ B_{2i} \end{bmatrix}$$

are the RGB values of the i-th pixel of the second image in the second color space, and $CA_1$ is a target matrix; performing RGB color space image processing on the third converted image to obtain a fourth convened image; convening the fourth convened image from the second color space to a YUV color space to obtain a fifth converted image; and performing YUV color space processing on the fifth converted image to obtain the target image, where $CA_1=M_2 \cdot Mcat_2 \cdot CA \cdot Mcat_1 \cdot M_1$, $M_1$ is a conversion matrix for conversion from the second color space to the XYZ color space, $M_2$ is a conversion matrix for conversion from the XYZ color space to the first color space, $Mcat_1$ is a conversion matrix for conversion from the XYZ color space to the LMS color space, $Mcat_2$ is a conversion matrix for conversion from the LMS color space to the XYZ color space, and CA is the second parameter. In the foregoing embodiment, the second image is multiplied by the target matrix to obtain the third converted image that is in the sRGB color space and that is obtained through chromatic adaptation processing, thereby saving computing resources of the electronic device.

According to a second aspect, an embodiment of this application provides an electronic device, where the electronic device includes one or more processors and a memory, the memory is coupled to the one or more processors, the memory is configured to store computer program code; the computer program code includes computer instructions, and the one or more processors invoke the computer instructions, so that the electronic device performs the following operations: detecting a first operation; starting a camera in response to the first operation; detecting a second operation; acquiring, by using the camera, a first image under a first ambient light source in response to the second operation, where the first image is an image in a first color space, and the first ambient light source is at least one ambient light source for acquisition of the first image; performing first image processing on the first image to obtain a second image in a second color space, where the second color space is different from the first color space; performing second image processing on the second image to obtain a target image; and storing the target image, where the performing second image processing on the second image to obtain a target image includes: obtaining a second parameter based on a first parameter of the first ambient light source, where the second parameter is a parameter related to a third color space, the first parameter includes a white balance parameter of the first ambient light source, the second parameter has a correspondence with the first parameter, the second parameter is used to identify light source information of the first ambient light source in the third color space, the third color space is different from the first color space, and the third color space is different from the second color space; and performing second image processing on the second image based on the second parameter to obtain the target image.

With reference to the second aspect, in a possible implementation, the one or more processors invoke the computer instructions, so that the electronic device performs the following operations: the performing first image processing on the first image to obtain a second image in a second color space includes: adjusting the first image based on a formula $$\begin{bmatrix} R'_{1i} \\ G'_{1i} \\ B'_{1i} \end{bmatrix} = \begin{bmatrix} R_{gain} & 0 & 0 \\ 0 & 1 & 0 \\ 0 & 0 & B_{gain} \end{bmatrix} \cdot \begin{bmatrix} R_{1i} \\ G_{1i} \\ B_{1i} \end{bmatrix}$$

to obtain an adjusted first image, where $$\begin{bmatrix} R_{1i} \\ G_{1i} \\ B_{1i} \end{bmatrix}$$

are RGB values of the i-th pixel of the first image;

$$\begin{bmatrix} R'_{1i} \\ G'_{1i} \\ B'_{1i} \end{bmatrix}$$

are RGB values of the i-th pixel of the adjusted first image, $R_{gain}=G/R$, $B_{gain}=G/B$, and the RGB are RGB values of the first ambient light source in the first color space; and adjusting the adjusted first image based on a formula $$\begin{bmatrix} R_{2i} \\ G_{2i} \\ B_{2i} \end{bmatrix} = CCM \cdot \begin{bmatrix} R'_{1i} \\ G'_{1i} \\ B'_{1i} \end{bmatrix}$$

to obtain the second image, where CCM is a color correction matrix obtained based on the first parameter, and $$\begin{bmatrix} R_{2i} \\ G_{2i} \\ B_{2i} \end{bmatrix}$$

are RGB values of the i-th pixel of the second image in the second color space.

With reference to the second aspect, in a possible implementation, the one or more processors invoke the computer instructions, so that the electronic device performs the following operations: the obtaining a second parameter based on a first parameter of the first ambient light source includes: calculating a degree D of chromatic adaptation based on the first parameter; calculating, based on the first parameter, LMS values of a white point corresponding to the first ambient light source in the third color space; calculating a gain matrix by using a formula $$M_{Gain1} = \begin{bmatrix} L_{dst}/L_{src} & 0 & 0 \\ 0 & M_{dst}/M_{src} & 0 \\ 0 & 0 & S_{dst}/S_{src} \end{bmatrix},$$

where $L_{dst}M_{dst}S_{dst}$ are LMS values of a reference white point in the third color space, a light source corresponding to the reference white point is a reference light source, and the $L_{src}M_{src}S_{src}$ values are the LMS values of the white point corresponding to the first ambient light source in the third color space; calculating LMS values of a target white point in the third color space based on a formula $$\begin{bmatrix} L_{cur} \\ M_{cur} \\ S_{cur} \end{bmatrix} = (D \cdot M_{Gain1} + 1 - D) \times Mcat_1 \times \begin{bmatrix} X_{src} \\ Y_{src} \\ Z_{src} \end{bmatrix},$$

where a light source corresponding to the target white point is a target light source, $$\begin{bmatrix} X_{src} \\ Y_{src} \\ Z_{src} \end{bmatrix}$$

are XYZ values of the white point corresponding to the first ambient light source in the XYZ color space, $$\begin{bmatrix} X_{src} \\ Y_{src} \\ Z_{src} \end{bmatrix}$$

are obtained based on the $L_{src}M_{src}S_{src}$ values, $Mcat_1$ is a conversion matrix for conversion from the XYZ color space to the LMS color space, and $$\begin{bmatrix} L_{cur} \\ M_{cur} \\ S_{cur} \end{bmatrix}$$

are the LMS values of the target white point in the third color space and calculating the second parameter by using a formula $$CA = \begin{bmatrix} L_{cur}/L_{dst} & 0 & 0 \\ 0 & M_{cur}/M_{dst} & 0 \\ 0 & 0 & S_{cur}/S_{dst} \end{bmatrix},$$

where CA is the second parameter.

With reference to the second aspect, in a possible implementation, the one or more processors invoke the computer instructions, so that the electronic device performs the following operations: the calculating a degree D of chromatic adaptation based on the first parameter specifically includes: calculating a first variable based on a formula $P_{xy} = \sqrt{(x_1-x_N)^2+(y_1-y_N)^2}$, where $P_{xy}$ is the first variable; $x_N$ is an x value of the reference white point in the xy chromaticity diagram, and $y_N$ is a y value of the reference white point in the xy chromaticity diagram; calculating a second variable based on a formula $D_c=1-e^{-5.3 \cdot P_{xy}}$, where $D_c$ is the second variable; and obtaining the degree D of chromatic adaptation based on a formula $D=0.96 \cdot D_c((1-e^{(-4.28 \cdot log\ La)})^{406.5}-1)+1$, where La is a lighting value of the first ambient light source.

With reference to the second aspect, in a possible implementation, the one or more processors invoke the computer instructions, so that the electronic device performs the following operations: the calculating, based on the first parameter, LMS values of a white point corresponding to the first ambient light source in the third color space specifically includes: calculating a third variable based on a formula $$i_y = \frac{1}{y_1},$$

where $i_y$ is the third variable; calculating XYZ values of the white point corresponding to the first ambient light source in the XYZ color space based on a formula $X_{src}=x_1 \cdot Y_{src} \cdot i_y$ and a formula $Z_{src}=Y_{src} \cdot (1-x_1-y_1) \cdot i_y$, where $X_{src}Y_{src}Z_{src}$ are the XYZ values of the white point corresponding to the first ambient light source in the XYZ color space. $Y_{src}=m$, and m is image brightness preset on the electronic device; and calculating LMS values of the white point corresponding to the first ambient light source in the third color space by using a formula $$\begin{bmatrix} L_{src} \\ M_{src} \\ S_{src} \end{bmatrix} = Mcat_1 \cdot \begin{bmatrix} X_{src} \\ Y_{src} \\ Z_{src} \end{bmatrix}, \text{where } \begin{bmatrix} L_{src} \\ M_{src} \\ S_{src} \end{bmatrix}$$

are LMS values of the white point corresponding to the first ambient light source in the third color space, and $Mcat_1$ is a conversion matrix for conversion from the XYZ color space to the LMS color space.

With reference to the second aspect, in a possible implementation, the one or more processors invoke the computer instructions, so that the electronic device performs the following operations: the performing second image processing on the second image based on the second parameter to obtain the target image specifically includes: performing third image processing on the second image to obtain a third image; performing chromatic adaptation processing on the third image based on a formula $$\begin{bmatrix} L_{4i} \\ M_{4i} \\ S_{4i} \end{bmatrix} = CA \cdot \begin{bmatrix} L_{3i} \\ M_{3i} \\ S_{3i} \end{bmatrix}$$

to obtain a fourth image, where CA is the second parameter, $$\begin{bmatrix} L_{3i} \\ M_{3i} \\ S_{3i} \end{bmatrix}$$

are LMS values of the third image in the third color space, and $$\begin{bmatrix} L_{4i} \\ M_{4i} \\ S_{4i} \end{bmatrix}$$

are LMS values of the fourth image in the third color space; and performing fourth image processing on the fourth image to obtain the target image.

With reference to the second aspect, in a possible implementation, the one or more processors invoke the computer instructions, so that the electronic device performs the following operations: the performing third image processing on the second image to obtain a third image specifically includes: converting the second image from the second color space to the XYZ color space based on a formula $$\begin{bmatrix} X_{2i} \\ Y_{2i} \\ Z_{2i} \end{bmatrix} = M_1 \cdot \begin{bmatrix} R_{2i} \\ G_{2i} \\ B_{2i} \end{bmatrix}$$

to obtain a first converted image, where $$\begin{bmatrix} R_{2i} \\ G_{2i} \\ B_{2i} \end{bmatrix}$$

are the RGB values of the i-th pixel of the second image in the second color space, $M_1$ is a conversion matrix for conversion from the second color space to the XYZ color space, and $$\begin{bmatrix} X_{2i} \\ Y_{2i} \\ Z_{2i} \end{bmatrix}$$

are XYZ values of the i-th pixel of the first converted image in the XYZ color space; and converting the first converted image from the XYZ color space to the third color space based on a formula $$\begin{bmatrix} L_{3i} \\ M_{3i} \\ S_{3i} \end{bmatrix} = Mcat_1 \cdot \begin{bmatrix} X_{2i} \\ Y_{2i} \\ Z_{2i} \end{bmatrix}$$

to obtain the third image, where $Mcat_1$ is a conversion matrix for conversion from the XYZ color space to the LMS color space, and $$\begin{bmatrix} L_{3i} \\ M_{3i} \\ S_{3i} \end{bmatrix}$$

are the LMS values of the third image in the third color space.

With reference to the second aspect, in a possible implementation, the one or more processors invoke the computer instructions, so that the electronic device performs the following operations: the performing fourth image processing on the fourth image to obtain the target image specifically includes: converting the fourth image from the third color space to the XYZ color space based on a formula $$\begin{bmatrix} X_{5i} \\ Y_{5i} \\ Z_{5i} \end{bmatrix} = Mcat_2 \cdot \begin{bmatrix} L_{4i} \\ M_{4i} \\ S_{4i} \end{bmatrix}$$

to obtain a second converted image, where $$\begin{bmatrix} X_{5i} \\ Y_{5i} \\ Z_{5i} \end{bmatrix}$$

are XYZ values of the i-th pixel of the second converted image in the XYZ color space, and $Mcat_2$ is a conversion matrix for conversion from the LMS color space to the XYZ color space; converting the second converted image from the XYZ color space to the second color space b using a formula $$\begin{bmatrix} R_{6i} \\ G_{6i} \\ B_{6i} \end{bmatrix} = M_2 \times \begin{bmatrix} X_{5i} \\ Y_{5i} \\ Z_{5i} \end{bmatrix}$$

to obtain a third converted image, where $M_2$ is used to convert the second converted image from the XYZ color space to the second color space, and $$\begin{bmatrix} R_{6i} \\ G_{6i} \\ B_{6i} \end{bmatrix}$$

are RGB values of the i-th pixel of the third converted image in the second color space; performing RGB color space image processing on the third converted image to obtain a fourth converted image; converting the fourth converted image from the second color space to a YUV color space to obtain a fifth converted image; and performing YUV color space processing on the fifth converted image to obtain the target image.

With reference to the second aspect, in a possible implementation, the one or more processors invoke the computer instructions, so that the electronic device performs the following operations: the performing second image processing on the second image based on the second image to obtain the target image specifically includes: performing fifth image processing on the second parameter based on a formula $$\begin{bmatrix} R_{6i} \\ G_{6i} \\ B_{6i} \end{bmatrix} = CA_1 \times \begin{bmatrix} R_{2i} \\ G_{2i} \\ B_{2i} \end{bmatrix}$$

to obtain a third converted image, where $$\begin{bmatrix} R_{6i} \\ G_{6i} \\ B_{6i} \end{bmatrix}$$

are RGB values of the i-th pixel of the third converted image in the second color space, $$\begin{bmatrix} R_{2i} \\ G_{2i} \\ B_{2i} \end{bmatrix}$$

are the RGB values of the i-th pixel of the second image in the second color space, and $CA_1$ is a target matrix; performing RGB color space image processing on the third converted image to obtain a fourth converted image; converting the fourth converted image from the second color space to a YUV color space to obtain a fifth converted image; and performing YUV color space processing on the fifth converted image to obtain the target image, where $CA_1=M_2$ $Mcat_2 \cdot CA \cdot Mcat_1 \cdot M_1$, $M_1$ is a conversion matrix for conversion from the second color space to the XYZ color space, $M_2$ is a conversion matrix for conversion from the XYZ color space to the first color space, $Mcat_1$ is a conversion matrix for conversion from the XYZ color space to the LMS color space, $Mcat_2$ is a conversion matrix for conversion from the LMS color space to the XYZ color space, and CA is the second parameter.

According to a third aspect, an embodiment of this application provides an electronic device, including a touchscreen, a camera, one or more processors, and one or more memories, where the one or more processors are coupled to the touchscreen, the camera, and the one or more memories, the one or more memories are configured to store computer program code, the computer program code includes computer instructions, and when the one or more processors execute the computer instructions, the electronic device is enabled to perform the method according to any one of the first aspect or the possible implementations of the first aspect.

According to a fourth aspect, an embodiment of this application provides a chip system, where the chip system is applied to an electronic device, the chip system includes one or more processors, and the processor is configured to invoke computer instructions, so that the electronic device performs the method according to any one of the first aspect or the possible implementations of the first aspect.

According to a fifth aspect, an embodiment of this application provides a computer program product including instructions, where when the computer program product is run on an electronic device, the electronic device is enabled to perform the method according to any one of the first aspect or the possible implementations of the first aspect.

According to a sixth aspect, an embodiment of this application provides a computer-readable storage medium including instructions, where when the instructions are run on an electronic device, the electronic device is enabled to perform the method according to any one of the first aspect or the possible implementations of the first aspect.

BRIEF DESCRIPTION OF DRAWINGS

FIG. 3A to FIG. 3D show a group of example user interfaces of an electronic device 100 according to an embodiment of this application;

FIG. 4A to FIG. 4D show another group of example screens of an electronic device 100 according to an embodiment of this application;

DESCRIPTION OF EMBODIMENTS

Figure 1A:
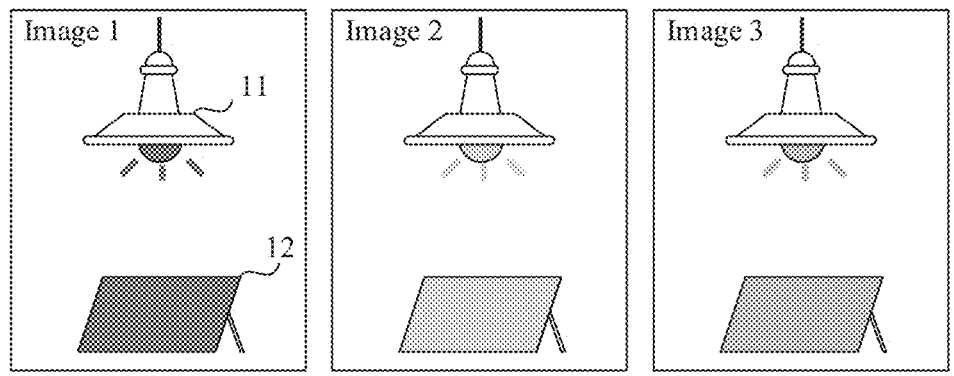
FIG. 1A and FIG. 1B show a group of example images under different light source conditions when no white balance adjustment is performed on the images according to an embodiment of this application.

The following clearly and completely describes the technical solutions in the embodiments of this application with reference to the accompanying drawings in the embodiments of this application. Apparently, the described embodiments are merely some but not all of the embodiments of this application. The "embodiment" mentioned in the specification means that a specific feature, structure, or characteristic described with reference to the embodiment may be included in at least one embodiment of this application. The phrase appearing in various positions in the specification does not necessarily mean a same embodiment, and is neither an independent or alternative embodiment mutually exclusive with other embodiments. It may be explicitly and implicitly understood by a person skilled in the art that the embodiments described in the specification may be combined with other embodiments. All other embodiments obtained by a person of ordinary skill in the art based on the embodiments of this application without creative efforts fall within the protection scope of this disclosure.

In the specification, claims, and accompanying drawings of this application, the terms "first", "second", "third", and so on are intended to distinguish between different objects but do not indicate a particular order of the objects. In addition, the terms "comprise", "include", and any variants thereof are intended to cover a non-exclusive inclusion, for example, including a list of steps or units; or optionally, further including steps or units that are not listed; or optionally; further including other steps or units inherent to such a process, method, product, or device.

The accompanying drawings show merely some but not all content related to this application. Before example embodiments are described in more details, it should be noted that some example embodiments are described as processing or methods depicted as flowcharts. Although the flowcharts describe operations (or steps) as sequential processing, many of the operations may be implemented in parallel, concurrently, or simultaneously. In addition, a sequence of the operations may be rearranged. The processing may be terminated when the operations of the processing are completed. However, there may be further additional steps not included in the accompanying drawings. The processing may correspond to a method, a function, a procedure, a subroutine, a sub-program, or the like.

The terms "component", "module", "system", "unit", and so on used in the specification are used to indicate a computer-related entity, hardware, firmware, a combination of hardware and software, software, or software in execution. For example, the unit may be, but is not limited to, a process running on a processor, a processor, an object, an executable file, an execution thread, or a program, and/or distributed between two or more computers. In addition, these units may be executed from various computer-readable media in which various data structures are stored. For example, the unit may perform communication by using a local process and/or a remote process based on a signal with one or more data packets (for example, coming from second unit data for interacting with a local system, a distributed system, and/or another unit in a network; or for example, an internet that interacts with another system by using a signal).

Some technical terms included in the embodiments of this application are explained below (1) Planckian locus: An object that performs neither reflection nor complete projection under the action of radiation but can absorb all radiation falling on the object is referred to as a black body or a perfect radiator. When the black body is continuously heated, a maximum value of a relative spectral power distribution of the black body moves toward a short-wave direction, and a corresponding light color changes in a sequence of red, yellow, white, and blue. An arc locus formed by the light color change corresponding to the black body in a chromaticity diagram at different temperatures is referred to as a black body locus or a Planckian locus.

(2) Correlated color temperature (Correlated Colour Temperature, CCT): a temperature of a black body radiator closest to a color with the same brightness stimulus, which is represented by using a Kelvin temperature and is used to describe a metric of a color of light near a Planckian locus. Light sources other than a thermal radiation light source have linear spectra, and radiation characteristics of these light sources are quite different from those of a black body, Therefore, light colors of these light sources may not accurately fall on a black body locus in a chromaticity diagram. For these light sources, the CCT is usually used to describe the color characteristics of the light sources.

(3) Chromaticity distance ($D_{uv}$): a distance from a chromaticity value (u, v) of a test light source to a nearest point on a Planckian locus, where $D_{uv}$ represents information about a color offset (green or pink) of the chromaticity value (u, v) of the test light source and the Planckian locus and a direction.

(4) Lighting value (Lighting Value, Lv): used to estimate ambient brightness, where a specific calculation formula is as follows:

$$Lv = 10 \times \log_2 \left( \frac{\text{Aperture}^2}{\text{Exposure}} * \frac{100}{Iso} * \frac{\text{Luma}}{46} \right),$$

where

Exposure is an exposure time, Aperture is an aperture size, Iso is a light sensitivity, and Luma is an average value of Y of an image in an XYZ color space.

Human eyes have color constancy. That is, when a color of light irradiating an object surface changes, people's perception of a color of the object surface still remains unchanged. A charge-coupled device (Charge-coupled Device, CCD) circuit or a CMOS circuit for converting an optical signal into an electrical signal in a camera cannot correct a color change of a light source like human eyes do. Therefore, a chromaticity value of a light source of a captured image needs to be estimated by using a white balance algorithm, and an image color needs to be adjusted by using the estimated chromaticity value of the light source, to eliminate impact of a color temperature of a light source in a photographing environment on the image color. A processed image color is not affected by a CCT of the light source in the photographing environment, thereby avoiding a problem of an image color deviation.

For example, FIG. 1A shows a group of example images under different light source conditions when no white balance adjustment is performed on the images. As shown in FIG. 1A, an image 1, an image 2, and an image 3 are images captured in the same photographing environment. In the photographing environment, there are an electric lamp 11 and a whiteboard 12, and the electric lamp 11 is the only light source in the photographing environment. The electric lamp 11 can emit light of three colors (a color 1 to a color 3). A position of the whiteboard 12 is within a lighting range of the electric lamp 11. The image 1 is an image captured when a light color of the electric lamp 11 is the color 1, the image 2 is an image captured when the light color of the electric lamp 11 is the color 2, and the image 3 is an image captured when the light color of the electric lamp 11 is the color 3. It can be learned from FIG. 1A that a color of the whiteboard in the image 1 changes with a change of light of the electric lamp when no white balance processing is performed on the image. To be specific, in the image 1, the color of the whiteboard is the color 1; in the image 2, the color of the whiteboard is the color 2; and in the image 3, the color of the whiteboard is the color 3.

Figure 1B:
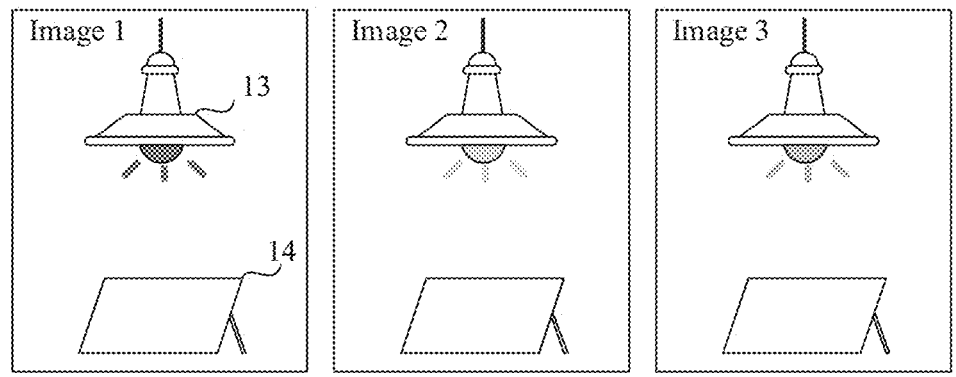

FIG. 1B shows a group of example images obtained by performing white balance processing on captured images in the same photographing environment as that in FIG. 1A. As shown in FIG. 1B, an image 1 is an image captured when a light color of an electric lamp 13 is a color 1, an image 2 is an image captured when the light color of the electric lamp 13 is a color 2, and an image 3 is an image captured when the light color of the electric lamp 13 is a color 3. It can be learned from FIG. 1B that a color of a whiteboard in the image 1 to the image 3 does not change with a change of the light color of the electric lamp 13 when white balance processing is performed on the image 1 to the image 3. To be specific, when the light color of the electric lamp 13 is the color 1, the color of the whiteboard 14 is white; when the light color of the electric lamp is the color 2, the color of the whiteboard is white; and when the light color of the electric lamp is the color 3, the color of the whiteboard is white.

It can be learned from FIG. 1A and FIG. 1B that white balance processing on an image can reduce impact of a light source in a photographing environment on an image color, so that a photographed object in the image can maintain its original color in different light source environments. To be specific, regardless how the light color of the electric lamp changes, a visual effect of the whiteboard in the images for people is still white.

However, it is found in scientific researches that human eyes have a characteristic of incomplete chromatic adaptation, that is, human eyes cannot completely correct a color of an object due to impact of an ambient light source and ambient brightness. As a result, human eyes do not maintain color constancy in a plurality of light source environments, and during observation of an object, a visual effect of human eyes on the object is usually different from a real color of the object. Therefore, after a camera performs white balance processing on an image, although impact of factors such as a correlated color temperature of an ambient light source on a color of a photographed object is eliminated and an original color of the image is restored, a color of an image obtained through white balance processing may be inconsistent with a color really observed by human eyes due to the characteristic of incomplete chromatic adaptation of human eyes.

Figure 1C:
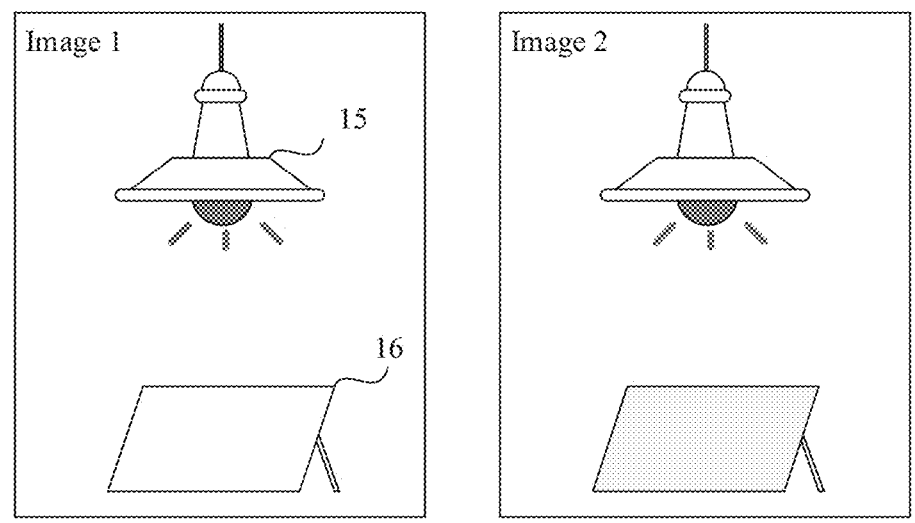
FIG. 1C shows an image obtained through white balance processing according to an embodiment of this application.

For example, as shown in FIG. 1C, an image 1 is an image obtained through white balance processing, and when a light color of an electric lamp 15 is a color 1, a color of a whiteboard 16 is white; and an image 2 is a whiteboard observed by human eyes, and when the light color of the electric lamp is the color 1, a color of the whiteboard observed by human eyes is a color 4.

To resolve the foregoing problem that a color of an image obtained through white balance processing is inconsistent with a color of an object really observed by human eyes, the embodiments of this application propose an image chromatic adaptation processing method. The method includes: An electronic device calculates chromaticity information of a light source in a photographing environment by using a white balance algorithm, and performs white balance processing and color restoration processing on an image to obtain a processed image, where the processed image is an image under a reference light source (for example, a D65 light source). Then the electronic device calculates a chromatic adaptation conversion matrix based on the chromaticity information of the light source in the photographing environment and a chromatic adaptation algorithm; performs chromatic adaptation processing on the image in an LMS color space by using the chromatic adaptation conversion matrix to obtain an image obtained through chromatic adaptation processing; converts the image obtained through chromatic adaptation processing from the LMS color space to an XYZ color space; converts the image from the XYZ color space to an sRGB color space; and then performs a series of processing on the image to obtain a chromatically adapted image consistent with a visual effect of human eyes.

Figure 2:
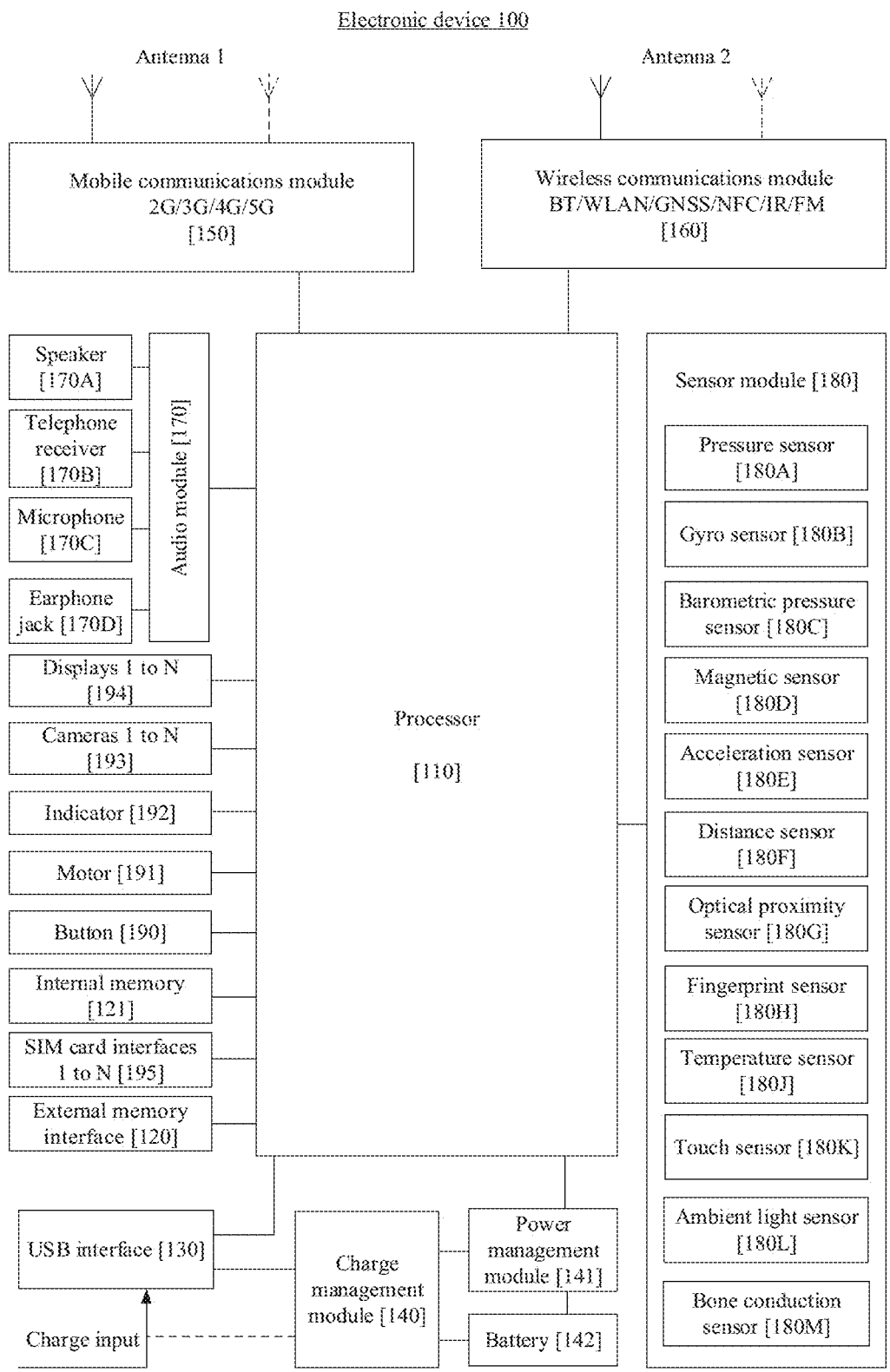
FIG. 2 is a schematic diagram of a hardware structure of an electronic device 100 according to an embodiment of this application.

The following describes a hardware structure of an electronic device included in the embodiments of this application with reference to FIG. 2. The electronic device has a Bluetooth function. FIG. 2 is a schematic diagram of a hardware structure of an electronic device 100 according to an embodiment of this application.

The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. It can be understood that the structure shown in this embodiment of the present invention does not constitute a specific limitation on the electronic device 100. In some other embodiments of this application, the electronic device 100 may include more or fewer components than shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

A wireless communication function of the electronic device 100 may be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further support multiplexing so as to increase antenna utilization. For example, the antenna 1 may be also used as a diversity antenna of a wireless local area network. In some other embodiments, an antenna may be used in combination with a tuning switch.

The mobile communications module 150 may provide wireless communication solutions including 2G, 3G, 4G, 5G, and the like which are applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave and radiate the electromagnetic wave by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The wireless communications module 160 may provide wireless communication solutions applied to the electronic device 100, including wireless local area network (wireless local area networks, WLAN) (for example, network), Bluetooth (Bluetooth, BT), BLE broadcast, global navigation satellite system (global navigation satellite system, GNSS), frequency modulation (frequency modulation, FM), near field communication (near field communication, NFC) technology, and infrared (infrared, IR) technology. The wireless communications module 160 may be one or more devices that integrate at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave and radiate the electromagnetic wave by using the antenna 2.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini LED, a micro LED, a micro OLED, a quantum dot light-emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, to convert the electrical signal into an image visible to a naked eye. The ISP may further optimize noise, brightness, and complexion of the image based on an algorithm. The ISP may further optimize parameters such as exposure and color temperature of a photographing scenario. In some embodiments, the ISP may be disposed in the camera 193.

The digital signal processor is configured to process a digital signal. In addition to a digital image signal, the digital signal processor may further process another digital signal. For example, when the electronic device 100 selects a frequency, the digital signal processor is configured to perform Fourier transformation and the like on frequency energy.

The NPU is a neural-network (neural-network, NN) computing processor. The NPU quickly processes input information with reference to a structure of a biological neural network, for example, with reference to a transfer mode between human brain neurons, and may further continuously perform self-learning. The NPU may implement applications such as intelligent cognition of the electronic device 100, for example, image recognition, facial recognition, speech recognition, and text comprehension.

The electronic device 100 may implement audio functions, for example, music playing and recording, by using the audio module 170, the speaker 170A, the telephone receiver 170B, the microphone 170C, the earphone jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a hands-free call by using the speaker 170A.

The telephone receiver 170B, also referred to as an "earpiece", is configured to convert an audio electrical signal into a sound signal. When the electronic device 100 is used to answer a call or listen to voice information, the telephone receiver 170B may be placed close to a human ear to listen to a voice.

The microphone 170C, also referred to as a "mike" or a "mic", is configured to convert a sound signal into an electrical signal. When making a call or sending voice information, a user may move a mouth close to the microphone 170C and make a sound, to input a sound signal into the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may be alternatively disposed in the electronic device 100, to collect a sound signal and reduce noise. The microphones may further identify a sound source, implement a directional recording function, and the like.

The pressure sensor 180A is configured to sense a pressure signal, and may convert the pressure signal into an electrical signal. In some embodiments, the pressure sensor 180A may be disposed in the display 194.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening/closing of a clamshell smart cover by using the magnetic sensor 180D.

The acceleration sensor 180E may detect a magnitude of an acceleration of the electronic device 100 in each direction (usually three axes). When the electronic device 100 is still, a magnitude and a direction of gravity may be detected. The acceleration sensor 180E may be further configured to identify a posture of the electronic device, and is applied to applications such as landscape/portrait mode switching and a pedometer.

The fingerprint sensor 180H is configured to collect a fingerprint. The electronic device 100 may implement fingerprint-based unlocking, application access lock, fingerprint-based photographing, fingerprint-based call answering, and the like by using characteristics of a collected fingerprint.

The touch sensor 180K is also referred to as a "touch panel". The touch sensor 180K may be disposed in the display 194, and the touch sensor 180K and the display 194 form a touchscreen, which is also referred to as a "touch control screen". The touch sensor 180K is configured to detect a touch operation acting on or near the touch sensor. The touch sensor may transmit the detected touch operation to the application processor to determine a type of a touch event. Visual output related to the touch operation may be provided by using the display 194. In some other embodiments, the touch sensor 180K may be alternatively disposed on a surface of the electronic device 100 at a different location than the display 194.

The bone conduction sensor 180M may obtain a vibration signal. In some embodiments, the bone conduction sensor 180M may obtain a vibration signal from a vibration bone of a human voice part.

The following describes three application scenarios included in an image chromatic adaptation processing method provided in the embodiments of this application.

Scenario 1: After an electronic device starts a camera application, the electronic device performs White balance processing and chromatic adaptation processing on an image acquired by the camera, and displays a processed image on a preview screen. When the electronic device 100 detects a tap operation on a photographing control, the electronic device takes a photo and stores the photo, where the photo is an image obtained through chromatic adaptation processing. The following describes the scenario 1 with reference to FIG. 3A to FIG. 3D. FIG. 3A to FIG. 3D show a group of example user interfaces of an electronic device 100 according to an embodiment of this application.

Figure 3A:
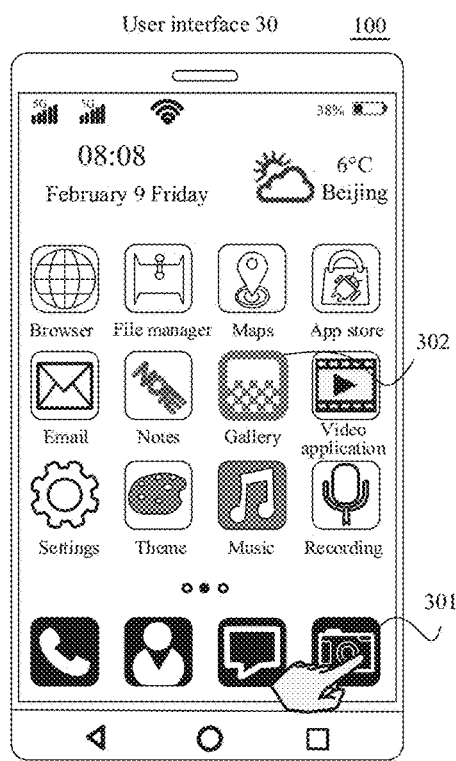

As shown in FIG. 3A, a user interface 30 is a main screen of the electronic device 100, and the user interface 30 includes a camera icon 301, a gallery icon 302, and other application icons. When the electronic device 100 detects an input operation (for example, tapping) on the camera icon 301, the electronic device 100 displays a user interface 31 shown in FIG. 3B in response to the operation.

Figure 3B:
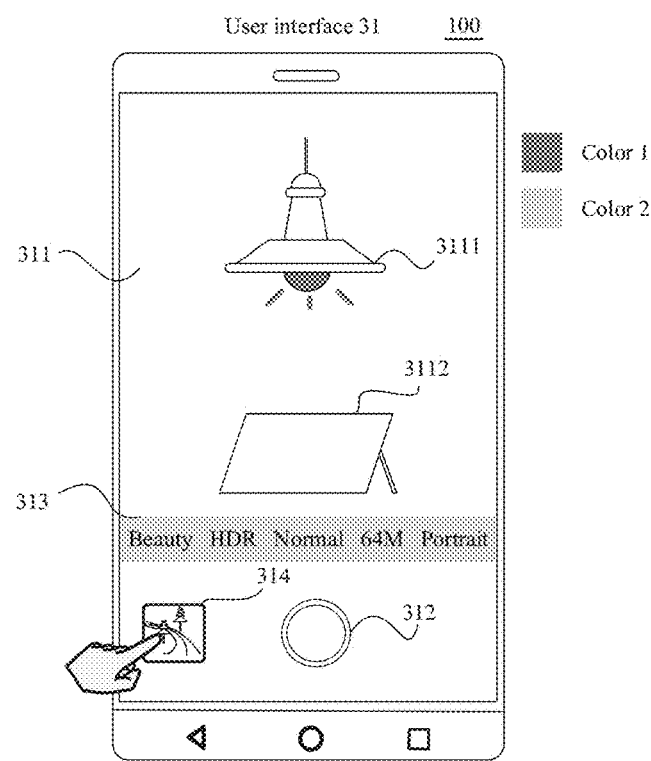

As shown in FIG. 3B, the user interface 31 is a photographing screen of the electronic device 100, and the user interface 31 includes an image display area 311, a capture control 312, and a photographing function setting area 313. The image display area 311 is used to display a preview image, where the preview image includes a electric lamp 3111 and a whiteboard 3112, and the preview image is an image obtained through chromatic adaptation processing. When the electronic device 100 detects an input operation (for example, tapping) on the capture control 312, the electronic device 100 takes a photo in response to the operation After the electronic device 100 takes a photo and detects a tap operation on a photo viewing icon 314, the electronic device 100 displays a user interface 32 shown in FIG. 3C in response to the operation.

Figure 3C:
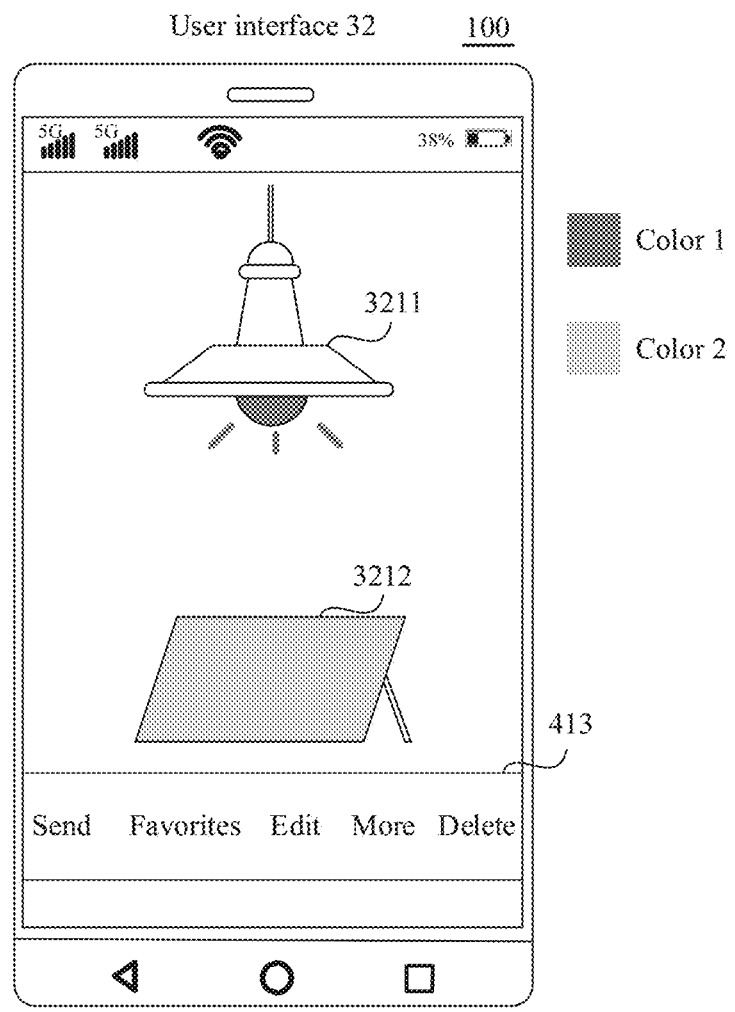

As shown in FIG. 3C, the user interface 32 is a screen for displaying an image captured by the electronic device 100, where the screen includes an edit box 413, and the image is an image obtained through chromatic adaptation processing. The image includes an electric lamp 3211 and a whiteboard 3212, where a light color of the electric lamp 3211 is a color 1, and a color of the whiteboard 3212 is a color 2.

FIG. 3D is a diagram of effects of a captured image (an image 1) obtained only through white balance processing and an image (an image 2) really observed by human eyes in the same photographing environment. In the image 1 and the image 2, a light color of an electric lamp is a color 1. In the image 1, a color of a whiteboard is white; and in the image 2, the color of the whiteboard is a color 2, It can be learned that a color of the captured image in FIG. 3C is closer to a color really observed by human eyes.

Figure 4C:
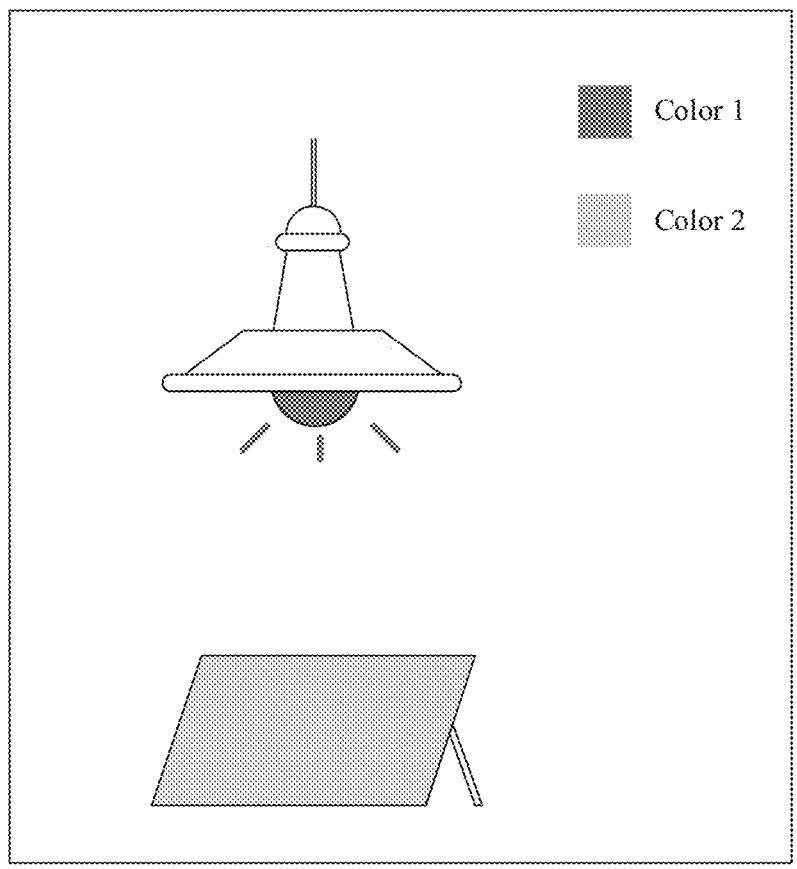

Scenario 2: After an electronic device 100 starts a camera application, an image preview window on a photographing screen displays an image of a photographing environment that is obtained through white balance processing. The photographing screen includes a chromatic adaptation processing control. When the electronic device 100 detects an input operation, for example, tapping, performed by a user on the chromatic adaptation processing control, the electronic device performs chromatic adaptation processing on a preview image in response to the operation, and displays a preview image obtained through chromatic adaptation processing in the image preview window. When the electronic device 100 detects an input operation, for example, tapping, on a capture control, the electronic device 100 takes a photo and stores a photo obtained through chromatic adaptation processing. The following describes the scenario 2 with reference to FIG. 4A to FIG. 4D. FIG. 4A and FIG. 4B show a group of example screens of an electronic device 100 according to an embodiment of this application.

As shown in FIG. 4A, a user interface 40 is a photographing screen of the electronic device 100, and the user interface 40 includes an image preview window 401, a capture control 402, a photographing function setting area 403, and a chromatic adaptation processing control 404, The image preview window 401 is used to display a preview image of a current photographing environment, and the photographing function setting area 403 includes a plurality of photographing function controls such as the chromatic adaptation processing control 404. It can be learned from the preview image window 404 that the preview image includes an electric lamp 4041 and a whiteboard 4042, where the whiteboard 4042 is within a lighting range of the electric lamp 4041, a light color of the electric lamp 4041 is a color 1, and a color of the whiteboard is white. When the electronic device 100 detects a tap operation on the chromatic adaptation processing control 404, the electronic device 100 displays a user interface 41 shown in FIG. 4B in response to the operation.

As shown in FIG. 4B, the user interface 41 is a photographing screen of the electronic device 100. A preview image displayed in an image preview window of the photographing screen is an image obtained through chromatic adaptation processing, and the image includes an electric lamp 4111 and a whiteboard 4112. A light color of the electric lamp 4111 is a color 1, and a color of the whiteboard 4112 is a color 2. FIG. 4C is a diagram of a color effect of really observing, by human eyes, an object in the photographing environment. In FIG. 4C, a light color of an electric lamp is a color 1, and a color of a whiteboard is a color 2. It can be learned from FIG. 4A to FIG. 4C that the color of the whiteboard in the preview image obtained through chromatic adaptation processing is closer to the color of the whiteboard really observed by human eyes. When the electronic device 100 detects an input operation (for example, tapping) on the capture control 412, the electronic device 100 displays a user interface 42 shown in FIG. 4D in response to the operation.

Figure 4D:
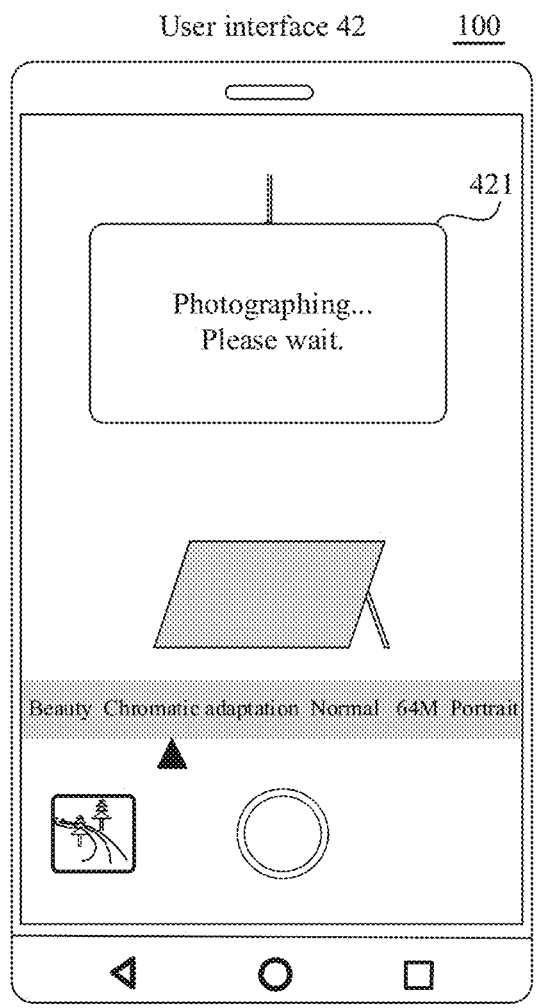

As shown in FIG. 4D, the user interface 42 is a photographing screen of the electronic device. The photographing screen includes a photographing prompt box 421, and the photographing prompt box 421 is used to indicate that the electronic device 100 is performing photographing processing. For example, in FIG. 4D, the photographing prompt box 421 displays text information: "Photographing . . . Please wait" The electronic device 100 performs chromatic adaptation processing on an image during photographing, and stores a photo obtained through chromatic adaptation processing to a gallery, so that a user can access the gallery to view the photo.

Scenario 3: An electronic device performs chromatic adaptation processing on a picture offline: A user can view a picture taken by the user in a gallery. When the electronic device 100 detects an input operation on a chromatic adaptation processing control, the electronic device 100 may perform chromatic adaptation processing on a photo in response to the input operation, to obtain and store a photo obtained through chromatic adaptation processing. The following describes the scenario 3 with reference to FIG. 5A to FIG. 5D. FIG. 5A to FIG. 5D show a group of example user interfaces of an electronic device 100 according to an embodiment of this application.

Figure 5A:
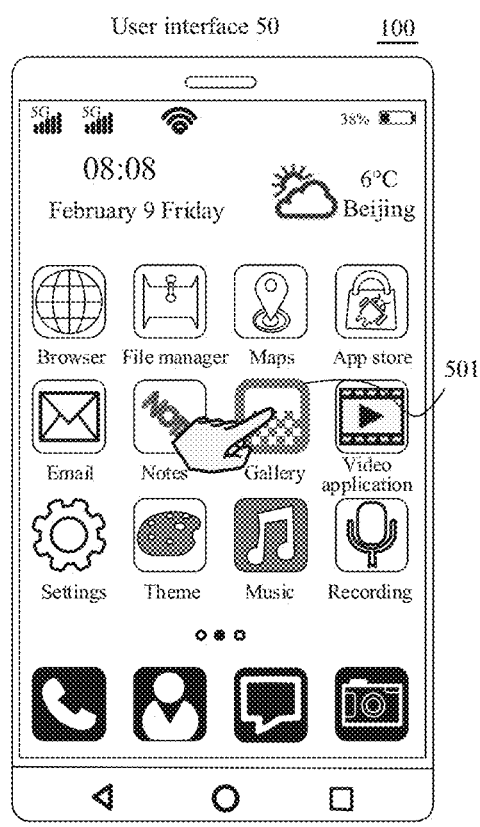
FIG. 5A to FIG. 5E show another group of example user interfaces of an electronic device 100 according to an embodiment of this application.

As shown in FIG. 5A, a user interface 50 is a main screen of the electronic device 100, and the user interface 50 includes a "gallery" icon 501 and other function controls. When the electronic device 100 detects an input operation (for example, tapping) on the "gallery" control 501, the electronic device 100 displays a user interface 51 shown in FIG. 5B in response to the operation.

Figure 5B:
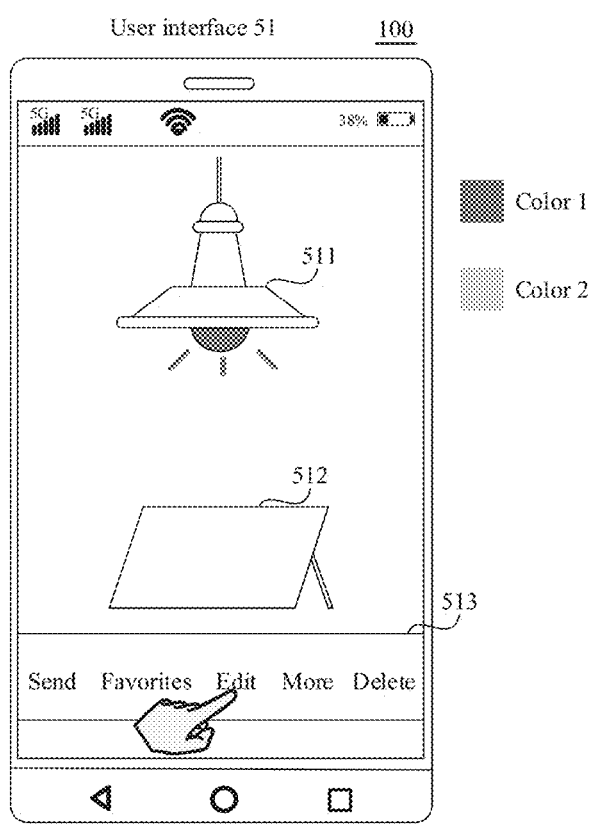

As shown in FIG. 5B, the user interface 51 is a photo viewing screen, and an image displayed on the photo viewing screen is an image without chromatic adaptation processing. As shown in FIG. 5B, the photo viewing screen includes an electric lamp 511 and a whiteboard 512, where a light color of the electric lamp 511 is a color 1, and a color of the whiteboard 512 is white. The user interface 51 includes an image setting area 513, and the image setting area 513 includes a "send" control, a "favorites" control, an "edit" control, a "more" control, and a "delete" control. When the electronic device 100 detects a tap operation on the "edit" control, the electronic device 100 displays a user interface 52 shown in FIG. 5C in response to the operation.

Figure 5C:
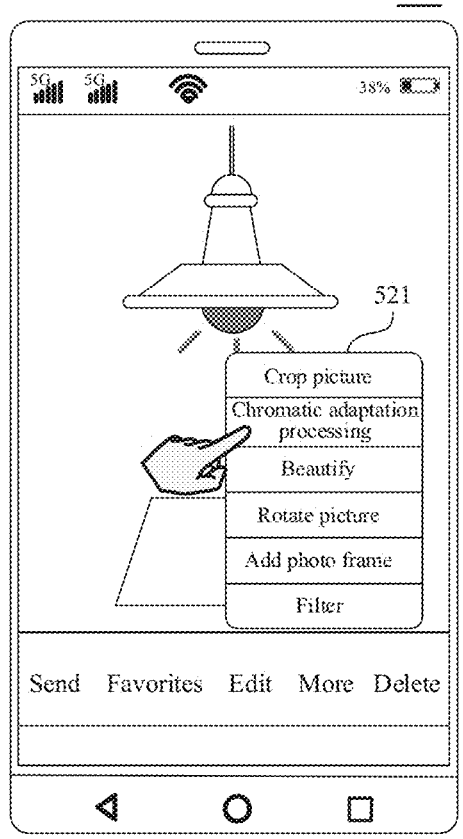
Figure 5D:
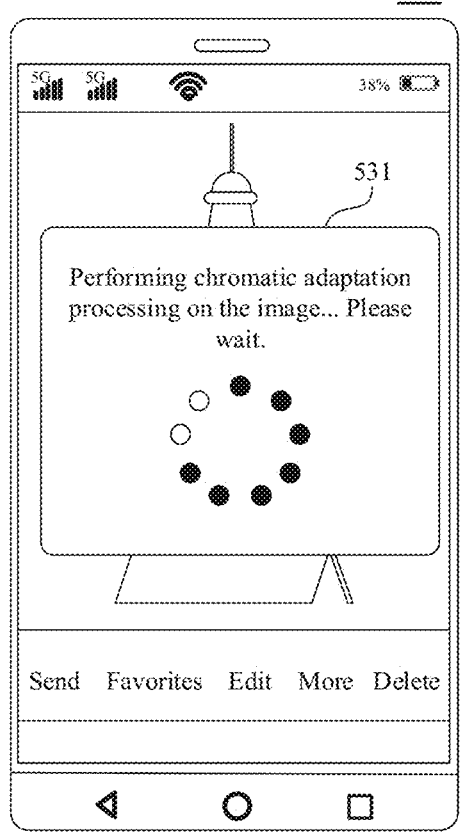

As shown in FIG. 5C, the user interface 52 includes a picture setting function box 521, and the picture setting function box 521 includes a "crop picture" function box, a "chromatic adaptation processing" function box, a "beautify" function box, and other function boxes. When the electronic device 100 detects a tap operation on the "chromatic adaptation processing" function box, the electronic device 100 displays a user interface 53 shown in FIG. 5D in response to the operation.

As shown in FIG. 5, the user interface 53 includes a "chromatic adaptation processing prompt box" 531, and the chromatic adaptation processing prompt box 531 is used to indicate that the electronic device 100 is currently performing chromatic adaptation processing, and includes prompt information for chromatic adaptation processing. As shown in FIG. 5D, the prompt information for chromatic adaptation processing may be: "Performing chromatic adaptation processing on the image . . . Please wait." After the electronic device 100 performs chromatic adaptation processing on the image, a user interface 54 shown in FIG. 5E is displayed.

Figure 5E:
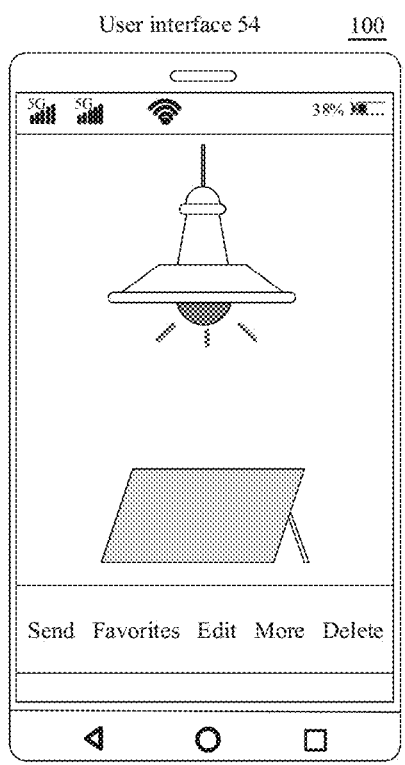
Figure 5F:
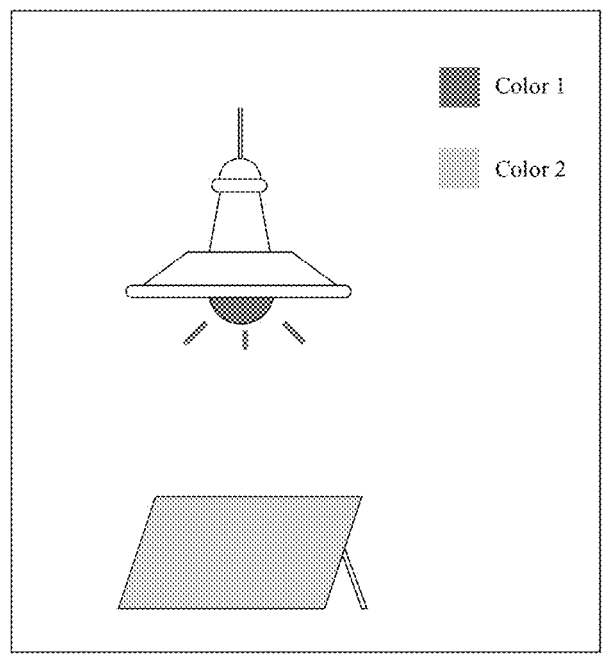
FIG. 5F shows a diagram of a visual effect of human eyes for a whiteboard in a photographing environment according to an embodiment of this application.

As shown in FIG. 5E, an image displayed on the user interface 54 is an image obtained through chromatic adaptation processing, where a light color of an electric lamp is a color 1, and a color of a whiteboard is a color 2. A diagram of a visual effect of observing the photographing environment by human eyes may be shown in FIG. 5F. It can be learned from FIG. 5E that the color of the whiteboard the image obtained through chromatic adaptation processing is close to the color of the whiteboard really observed by human eyes in the same photographing environment.

The foregoing describes, with reference to FIG. 3A to FIG. 5E, three application scenarios included in an image chromatic adaptation processing method provided in the embodiments of this application. The following describes, with reference to the accompany drawings, a specific process of performing, by an electronic device, chromatic adaptation processing on an image in each of the foregoing three application scenarios.

Figure 6:
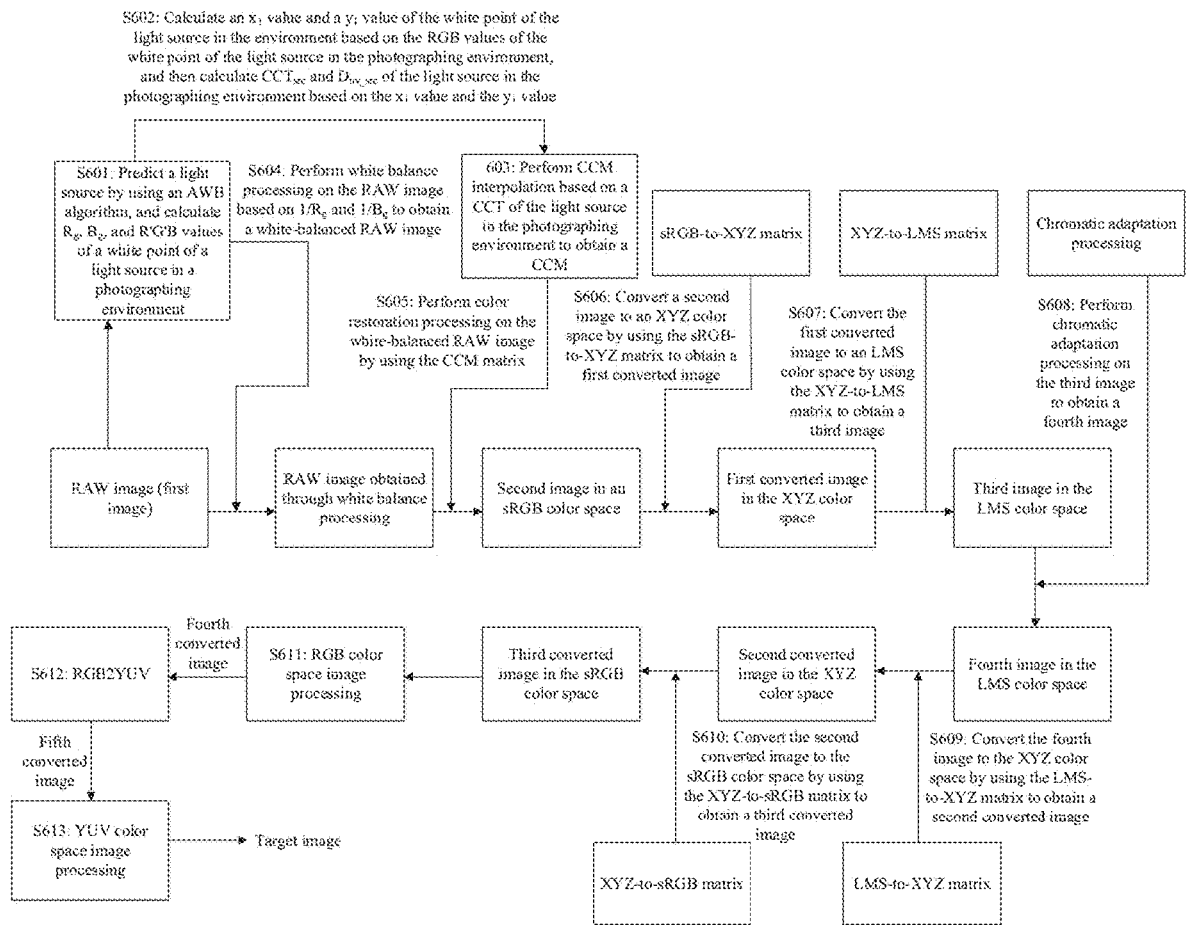
FIG. 6 is a block diagram of image processing according to an embodiment of this application.

The following describes, with reference to FIG. 6, a framework of performing, by an electronic device, chromatic adaptation processing on an image in the foregoing scenario 1. FIG. 6 is a block diagram of image processing according to an embodiment of this application. A specific process is as follows:

Step S601: The electronic device predicts a light source by using a RAW image output by a camera, and calculates $R_g$ and $B_g$ of a white point of a light source in a photographing environment and RGB values of the white point of the light source in the photographing environment.

Step S602: The electronic device calculates an $x_1$ value and a $y_1$ value of the white point of the light source in the environment based on the RGB values of the white point of the light source in the photographing environment, and then calculates $CCT_{src}$ and $D_{uv\_src}$ of the light source in the photographing environment based on the $x_1$ value and the $y_1$ value.

Step S603: The electronic device performs CCM interpolation based on the CCT of the light source in the photographing environment to obtain a color correction matrix CCM.

Step S604: The electronic device performs white balance processing on the RAW image based on $1/R_g$ and $1/B_g$ to obtain a RAW image obtained through white balance processing.

Step S605: The electronic device performs, by using the CCM, color restoration processing on the RAW image obtained through white balance processing to obtain a second image in an sRGB color space.

Step S606: The electronic device converts the second image to an XYZ color space by using an sRGB-to-XYZ matrix to obtain a first converted image.

Step S607: The electronic device converts the first converted image to an LMS color space by using an XYZ-to-LMS matrix to obtain a third image.

Step S608: The electronic device performs chromatic adaptation processing on the third image to obtain a fourth image.

Step S609: The electronic device converts the fourth image to the XYZ color space by using an LMS-to-XYZ matrix to obtain a second converted image.

Step S610: The electronic device converts the second converted image to the sRGB color space by using an XYZ-to-sRGB matrix to obtain a third converted image.

Step S611: The electronic device performs RGB color space image processing on the third converted image to obtain a fourth converted image.

Specifically, the RGB color space image processing includes performing DRC (dynamic range compression) processing and/or gamma (GAMMA) processing on the third converted image.

Step S612: The electronic device converts the fourth converted image from the sRGB color space to a YUV color space to obtain a fifth converted image.

Step S613: The electronic device performs YUV color space processing on the fifth converted image to obtain a target image.

Specifically, the YUV color space image processing includes performing tone mapping processing (Tone mapping processing) and/or 3D LUT processing on the image.

In a possible implementation, after performing YIN color space processing on the fifth converted image, the electronic device may convert a processed image into a MEG format to obtain the target image.

By processing the RAW image output by the camera based on the foregoing block diagram of image processing, the electronic device can obtain a chromatically adapted image consistent with a visual effect of human eyes.

Figure 7:
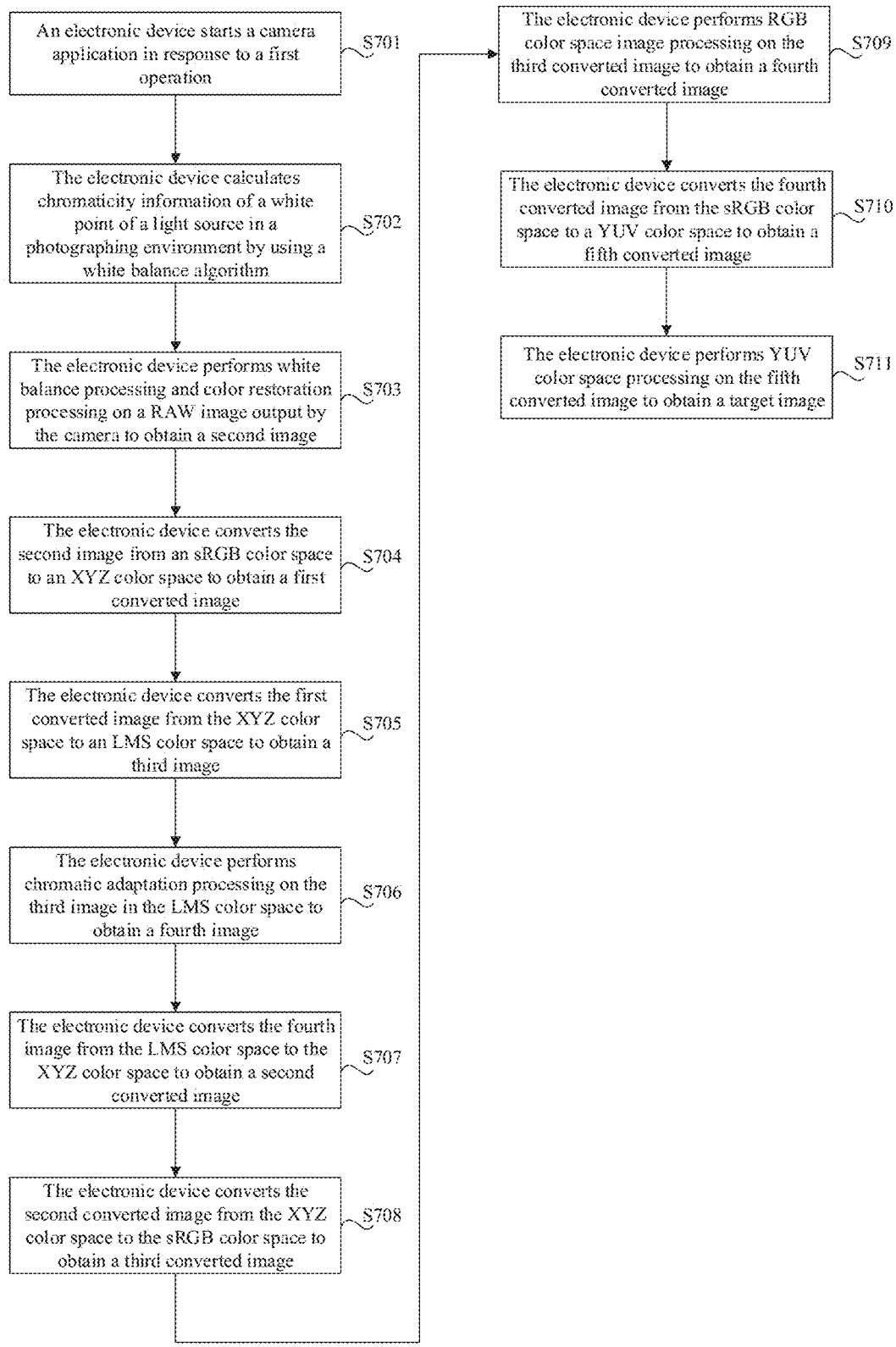
FIG. 7 is a flowchart of an image processing method according to an embodiment of this application.

The following describes in detail the steps in the block diagram of FIG. 6 with reference to FIG. 7. FIG. 7 is a flowchart of an image processing method according to an embodiment of this application. A specific process is as follows:

Step S701: An electronic device starts a camera application in response to a first operation.

For example, the first operation may be the tap operation on the camera icon in the embodiment of FIG. 3A, and when the electronic device 100 detects the tap operation on the camera icon, the electronic device starts the camera application.

Step S702: The electronic device calculates chromaticity information of a white point of a light source in a photographing environment by using a white balance algorithm.

Specifically, after the camera is started, the camera outputs a RAW image. The RAW image is a first image in a first color space, and the first color space is a RAW space. The RAW image is original data obtained by a CMOS image sensor or a CCD image sensor of the camera by converting a captured light source signal into a digital signal. After the camera outputs the RAW image, the electronic device may calculate RGB values of the white point of the light source in the photographing environment in an RGB color space, $R_g$, and $B_g$ based on the white balance algorithm. The RGB values, $R_g$, and $B_g$ are the chromaticity information of the white point of the light source in the photographing environment. The light source in the photographing environment is a first ambient light source, and the first ambient light source includes at least one ambient light source. For example, the ambient light source may be a solar light source or a lamp light source. $R_{gain}=1/R_g$, $B_{gain}=1/B_g$, $R_{gain}=G/R$, and $B_{gain}=G/B$, where $R_{gain}$ and $B_{gain}$ are respectively gain values on an R channel and a B channel to be used for white balance processing under the ambient light source, and R, G, and B are an R value, a G value, and a B value of an RGB channel respectively.

It should be understood that the electronic device may calculate the Chromaticity information of the light source in the photographing environment by using a conventional automatic white balance algorithm (for example, a gray world algorithm), or may calculate the chromaticity information of the light source in the photographing environment by using an AI automatic white balance algorithm. A type of the white balance algorithm used by the electronic device is not limited in this embodiment of this application.

Step S703: The electronic device performs white balance processing and color restoration processing on the RAW image output by the camera to obtain a second image.

Specifically, to resolve a problem of an image color deviation caused by the light source in the photographing environment, the electronic device needs to perform white balance processing and color restoration processing on the RAW image output by the camera to obtain the second image. A specific process of performing, by the electronic device, white balance processing on the RAW image is as follows: The electronic device adjusts ROB values of each pixel of the RAW image to make values of three color channels of the white point of the light source of the image equal, that is, R=G=B. The electronic device may adjust the ROB values of the RAW image by using a formula (1), to perform white balance adjustment on the image. The formula (1) is shown below:

$$\begin{bmatrix} R'_{1i} \\ G'_{1i} \\ B'_{1i} \end{bmatrix} = \begin{bmatrix} R_{gain} & 0 & 0 \\ 0 & 1 & 0 \\ 0 & 0 & B_{gain} \end{bmatrix}, \text{ where} \quad (1)$$

$$\begin{bmatrix} R_{1i} \\ G_{1i} \\ B_{1i} \end{bmatrix}$$

are RGB values of the i-th pixel of the RAW image, and $$\begin{bmatrix} R'_{1i} \\ G'_{1i} \\ B'_{1i} \end{bmatrix}$$

are RGB values of the i-th pixel of an image obtained through white balance adjustment.

Color restoration by the camera is greatly different from an object color perceived by an observer due to a large difference between a spectral response of a semiconductor sensor and a spectral response of human eyes to visible light. In addition, ROB of the RAW image is a device-related ROB color space, but not a general color space. In addition, after white balance adjustment is performed on the RAW image, only some colors of a photographed object in the image are restored (for example, only neutral colors such as white or gray in the image are restored). Therefore, a degree of color restoration of an object in the image needs to be improved, and a color space of the image needs to be converted from the device-related Device ROB space to a device-independent sRGB space. Therefore, the electronic device needs to perform color restoration processing on the image obtained through white balance processing to improve a degree of color restoration of the image. The electronic device may perform, by using the color correction matrix (Color Correction Matrix, CCM), color restoration processing on the image obtained through white balance processing to obtain the second image.

The electronic device may obtain, through calibration, a CCM with a size of 3×3 in different light source environments (typical light sources include A, H, U30, TL84, D50, D65, D75, and the like) and store the CCM on the electronic device. The electronic device may select a corresponding CCM by using the RGB values, calculated by the electronic device, of the white point of the light source in the photographing environment. If the RGB values are between two light sources (for example, the RGB values of the white point of the light source in the photographing environment fall between D50 and D65), the CCM may be obtained by performing bilinear interpolation by using D50 and D65. For example, a color correction matrix of D50 is $CCM_1$, and a correlated color temperature is $CCT_1$; a color correction matrix of D50 is $CCM_2$, and a correlated color temperature is $CCT_2$; and a correlated color temperature of the light source in the photographing environment is $CCT_a$. The electronic device may obtain a ratio g based on a formula (2). The formula (2) is shown below:

$$g = \frac{CCT_a^{-1} - CCT_2^{-1}}{CCT_1^{-1} - CCT_2^{-1}} \qquad (2)$$

Then the electronic device may calculate, based on a formula (3), the CCM corresponding to the white point of the light source in the photographing environment:

$$CCM = g*CCM_1 + (1-g) \times CCM_2 \qquad (3)$$

After the electronic device calculates the CCM corresponding to the white point of the light source in the photographing environment, the electronic device may adjust the RGB values of the image by using a formula (4) to obtain the second image. The formula (4) is shown below:

$$\begin{bmatrix} R_{2i} \\ G_{2i} \\ B_{2i} \end{bmatrix} = CCM \cdot \begin{bmatrix} R'_{1i} \\ G'_{1i} \\ B'_{1i} \end{bmatrix}, \text{ where} \qquad (4)$$

$$\begin{bmatrix} R'_{1i} \\ G'_{1i} \\ B'_{1i} \end{bmatrix}$$

are the RGB values of the i-th pixel of the RAW image obtained through white balance adjustment, and $$\begin{bmatrix} R_{2i} \\ G_{2i} \\ B_{2i} \end{bmatrix}$$

are RGB values of the i-th pixel of the second image. In this case, a color space of the second image is an sRGB color space, and the sRGB color space is a second color space.

It should be understood that the foregoing embodiment is merely example descriptions of performing, by the electronic device, white balance processing and color restoration processing on the image, and the electronic device may alternatively perform white balance processing and color restoration processing on the RAW image by using another method to obtain the second image. A manner of performing, by the electronic device, white balance processing and color restoration processing on the RAW image is not limited in this embodiment of this application.

Step S704: The electronic device converts the second image from the sRGB color space to an XYZ color space to obtain a first converted image.

Specifically, the second image obtained through white balance processing resolves a problem of a color deviation due to impact of the light source in the photographing environment. However, according to a theory of incomplete chromatic adaptation of human eyes, human eyes do not always maintain color constancy due to impact of ambient brightness and an ambient light source, that is, a color of an object really observed by human eyes always deviates from a real color of the object. Therefore, a color of the second image obtained through white balance processing and color restoration processing is different from a color observed by human eyes under some ambient light sources. To make the color of the image consistent with that observed by human eyes, color adjustment may be performed on the image in an LMS color space, so that the color of the image is consistent with the color really observed by human eyes. The LMS color space is a third color space.

The color space is a color space represented by a response of three types of cones of human eyes, and is named after their responsivity at a long wavelength, a medium wavelength, and a short wavelength. Chromatic adaptation processing may be performed on an image in the LMS color space, so that a color of a processed image is more consistent with a color really observed by human eyes. Because the LMS color space may be converted from the XYZ color space, the electronic device may convert the color space of the second image from the sRGB color space to the XYZ color space to obtain the first converted image.

The electronic device may convert the second image by using a formula (5) to obtain the first converted image. The formula (5) is shown below:

$$\begin{bmatrix} X_{2i} \\ Y_{2i} \\ Z_{2i} \end{bmatrix} = M_1 \cdot \begin{bmatrix} R_{2i} \\ G_{2i} \\ B_{2i} \end{bmatrix}, \text{ where} \qquad (5)$$

$$\begin{bmatrix} R_{2i} \\ G_{2i} \\ B_{2i} \end{bmatrix}$$

are the RGB values of the i-th pixel of the second image, $$\begin{bmatrix} X_{2i} \\ Y_{2i} \\ Z_{2i} \end{bmatrix}$$

are XYZ values of the i-th pixel of the first converted image, and $M_1$ a conversion matrix with a size of 3×3, where the conversion matrix is an sRGB-to-XYZ matrix, and is used to convert the second image from the sRGB color space to the XYZ color space. For example, a form of $M_1$ may be as follows:

$$M_1 = \begin{bmatrix} 0.4124564 & 0.3575761 & 0.1804375 \\ 0.2126729 & 0.7151522 & 0.0721750 \\ 0.0193339 & 0.1191920 & 0.9503041 \end{bmatrix}$$

Step S705: The electronic device converts the first converted image from the XYZ color space to the LMS color space to obtain a third image.

Specifically, the LMS color space is a color space represented by a response of three types of cones of human eyes, and is named after their responsivity at a long wavelength, a medium wavelength, and a short wavelength. Chromatic adaptation processing may be performed on an image in the LMS color space, so that a color of a processed image is more consistent with a color really observed by human eyes. For example, the electronic device may convert the first converted image from the XYZ color space to the LMS color space by using a formula (6). The formula (6) is shown below:

$$\begin{bmatrix} L_{3i} \\ M_{3i} \\ S_{3i} \end{bmatrix} = Mcat_1 \cdot \begin{bmatrix} X_{2i} \\ Y_{2i} \\ Z_{2i} \end{bmatrix}, \text{ where} \qquad (6)$$

$$\begin{bmatrix} X_{2i} \\ Y_{2i} \\ Z_{2i} \end{bmatrix}$$

are the XYZ values of the i-th pixel of the first converted image in the XYZ color space, Meat, is an XYZ-to-LMS matrix, and is used to convert an image from the XYZ color space to the LMS color space, and $$\begin{bmatrix} L_{3i} \\ M_{3i} \\ S_{3i} \end{bmatrix}$$

are LMS values of the i-th pixel of the third image in the LMS color space. For example, $Mcat_1$ may be as follows:

$$Mcat_1 = \begin{bmatrix} 0.8951 & 0.2664 & -0.1614 \\ -0.7502 & 1.7135 & 0.0367 \\ 0.0389 & -0.0685 & 1.0296 \end{bmatrix}$$

Step S706: The electronic device performs chromatic adaptation processing on the third image in the LMS color space to obtain a fourth image.

Specifically, to make a color of an image captured by the electronic device more consistent with a color of an image really observed by human eyes, the electronic device needs to perform chromatic adaptation processing on the third image, so that the color of the captured image conforms to the theory of incomplete chromatic adaptation of human eyes, and is closer to the color really observed by human eyes. The electronic device may perform chromatic adaptation processing on the third image in the LMS color space by using a chromatic adaptation conversion matrix CA to obtain the fourth image.

Figure 8:
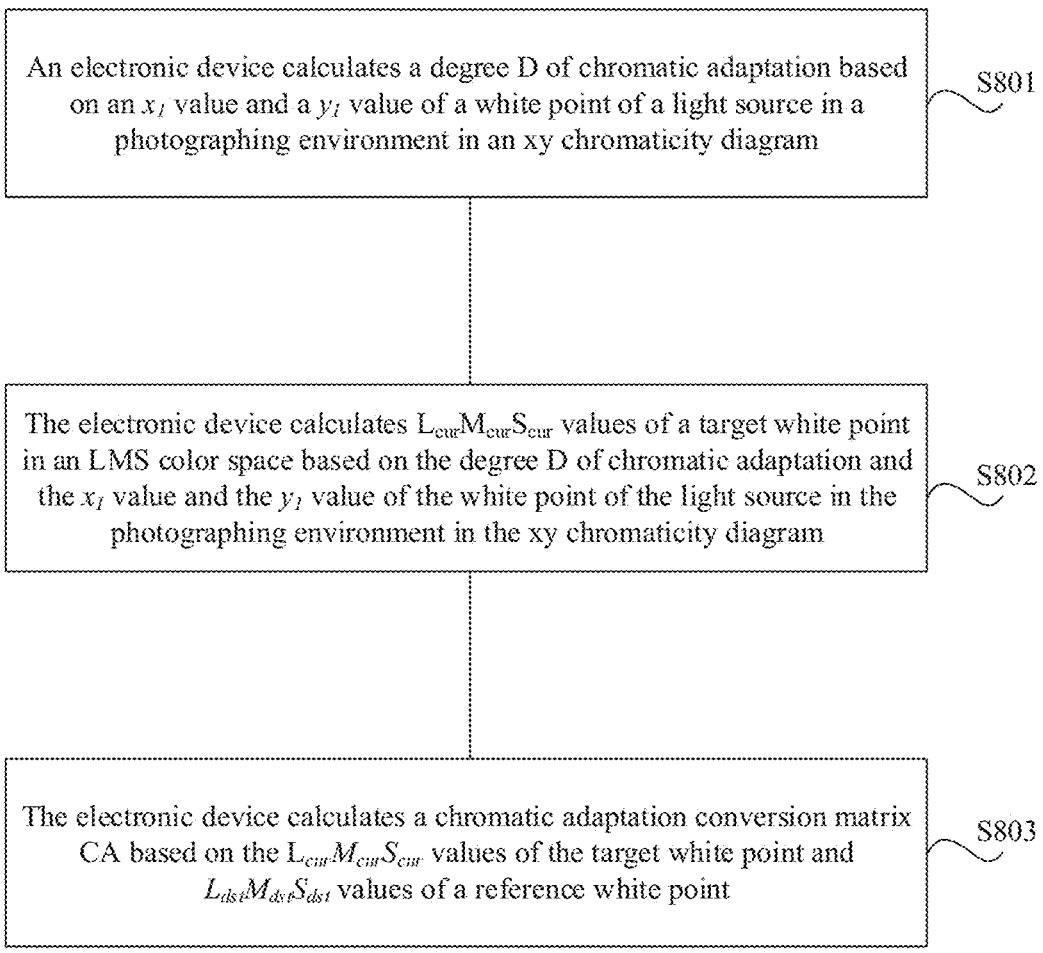
FIG. 8 is a flowchart of calculating, by an electronic device, a chromatic adaptation conversion matrix according to an embodiment of this application.

The following describes a specific process of calculating the chromatic adaptation conversion matrix by the electronic device with reference to FIG. 8. FIG. 8 is a flowchart of calculating, by an electronic device, a chromatic adaptation conversion matrix according to an embodiment of this application. A specific process is as follows:

Step S801: The electronic device calculates a degree D of chromatic adaptation based on an $x_1$ value and a $y_1$ value of a white point of a light source in a photographing environment in an xy chromaticity diagram.

Specifically, the degree D of chromatic adaptation is a parameter of a chromatic adaptation model, is used to represent a degree of chromatic adaptation of the chromatic adaptation model under different light source conditions, and is mainly determined by a CCT of an ambient light source and ambient brightness La (unit: candela/square meter). The electronic device may calculate Lv of the photographing environment, and then convert Lv into calculation of La. For a calculation method tier Lv, refer to related explanations of the foregoing technical term (4). Details are not described in this embodiment of this application again. A value range of D is [0, 1]. When D is 0, it indicates that the chromatic adaptation model is completely chromatically non-adaptive to the ambient light source. To be specific, the chromatic adaptation model is affected by the CCT of the ambient light source CCT and La, and an obtained object color greatly deviates from a real color of an object. When D is 1, it indicates that the chromatic adaptation model is completely chromatically adaptive to the ambient light source. To be specific, the chromatic adaptation model is barely affected by the CCT of the ambient light source or La, an obtained object color barely deviates from a real color of an object, and a larger value of the degree D of chromatic adaptation indicates a higher degree of chromatic adaptation of the chromatic adaptation model.

The chromatic adaptation model is a model designed by researchers by collecting corresponding color data sets and performing fitting through massive experiments to simulate chromatic adaptation of human eyes to an environment, and the corresponding color data sets are obtained through a psychophysical experiment. The psychophysical experiment is intended to enable an observer to find a corresponding color matching a color under two different lighting conditions. For example, the observer is enabled to adjust or select a memory color of a familiar object under a daylight condition and a reference light source (a D65 light source), to obtain a plurality of sets of corresponding color data under various light sources and the D65 light source.

The electronic device may calculate a first variable $P_{xy}$ by using a formula (7). The formula (7) is shown below:

$$P_{xy}=\sqrt{(x_1-x_N)^2+(y_1-y_N)^2} \qquad (7),\text{ where}$$

$P_{xy}$ is the first variable, and is used to represent a distance between the white point of the light source in the photographing environment and a reference white point (in this embodiment of this application, an example in which a reference light source is the D65 light source is used for description), the $x_1$ value and the $y_1$ value are respectively an x value and a y value of the white point of the light source in the photographing environment in the xy chromaticity diagram, $x_1$ is used to identify the x value of the white point of the light source in the environment in the xy chromaticity diagram, $y_1$ is used to identify the y value of the white point of the light source in the environment in the xy chromaticity diagram, and $x_N$ and $y_N$ are respectively an x value ($x_N$=0.3127) and a y value ($y_N$=0.3290) of the reference white point in the xy chromaticity diagram.

A first parameter includes the $x_1$ value and the $y_1$ value. The $x_1$ value and the $y_1$ value may be obtained by using RGB values of the white point of the light source in the photographing environment. For example, the RGB values of the white point of the light source in the photographing environment may be converted into $X_1Y_1Z_1$ values of the white point of the light source in the photographing environment in an XYZ color space by using a CCM, and the $x_1$ value and the $y_1$ value are obtained based on the $X_1Y_1Z_1$ values. Calculation formulas related to the $x_1$ value and the $y_1$ value may be shown in a formula (8) to a formula (10):

$$\begin{bmatrix} X_1 \\ Y_1 \\ Z_1 \end{bmatrix} = CCM \cdot \begin{bmatrix} R \\ G \\ B \end{bmatrix}; \qquad (8)$$

$$x_1 = \frac{X_1}{X_1+Y_1+Z_1}; \qquad (9)$$

$$y_1 = \frac{Y_1}{X_1+Y_1+Z_1} \qquad (10)$$

After calculating the first variable, the electronic device may calculate a second variable $D_c$ by using a formula (11). The formula (11) is shown below:

$$D_c=1-e^{-5.3 \cdot P_{xy}} \qquad (11)$$

After calculating the second variable $D_c$, the electronic device may calculate the degree D of chromatic adaptation based on a formula (12). The formula (12) is shown below:

$$D=0.96 \cdot D_c((1-e^{(-4.28 \cdot \log La)})^{406.5}-1)+1 \qquad (12),\text{ where}$$

$e^{(-4.28 \cdot \log La)}$ is an exponential function whose base is a constant e, and e is approximately 2.71828.

It should be understood that the foregoing calculation method for the degree D of chromatic adaptation is only an example calculation method for the degree D of chromatic adaptation for description in this embodiment of this application. A calculation method for the degree D of chromatic adaptation is not limited in this embodiment of this application.

Step S802: The electronic device calculates $L_{cur}M_{cur}S_{cur}$ values of a target white point in an LMS color space based on the degree D of chromatic adaptation and the $x_1$ value and the $y_1$ value of the white point of the light source in the photographing environment in the xv chromaticity diagram.

Specifically, the target white point is a white point calculated by using a chromatic adaptation algorithm, and is a white point, predicted by the electronic device, of the light source, and the $L_{cur}M_{cur}S_{cur}$ values are the LMS values of the target white point in the LMS color space. A calculation method for the $L_{cur}M_{cur}S_{cur}$ values of the target white point is as follows:

Because a Y value in the XYZ color space is used to indicate brightness, the electronic device may set a $Y_{src}$ value to be different constants m according to a color brightness requirement. When m=1, it indicates that the electronic device does not adjust image brightness when calculating a chromatic adaptation conversion relationship. An example in which $Y_{src}=1.0$ is used for description in this embodiment of this application. After determining $Y_{src}$, the electronic device may calculate a third variable $i_y$ by using a formula (13). The formula (13) is shown below:

$$i_y = \frac{1}{y_1} \quad (13)$$

Then the electronic device calculates, based on a formula (14) and a formula (15), an $X_{src}$ value and a $Z_{src}$ value of the white point of the light source in the photographing environment in the XYZ color space when $Y_{src}=1$. The formula (14) and the formula (15) are shown below:

$$X_{src}=x_1 \cdot Y_{src} \cdot i_y \quad (14);$$

$$Z_{src}=Y_{src} \cdot (1-x_1-y_1) \cdot i_y \quad (15)$$

In this way, the electronic device may calculate XYZ values, namely, the $X_{src}Y_{src}Z_{src}$ values, of the white point of the light source in the photographing environment in the XYZ color space by using the formula (15). After calculating the $X_{src}Y_{src}Z_{src}$ values, the electronic device may obtain LMS values, namely, the $L_{src}M_{src}S_{src}$ values, of the white point of the light source in the photographing environment in the LMS color space based on the $X_{src}Y_{src}Z_{src}$ values. For example, the electronic device may calculate the $L_{src}M_{src}S_{src}$ values of the white point of the light source in the photographing environment in the LMS color space by using a formula (16). The formula (16) is shown below:

$$\begin{bmatrix} L_{src} \\ M_{src} \\ S_{src} \end{bmatrix} = Mcat_1 \cdot \begin{bmatrix} X_{src} \\ Y_{src} \\ Z_{src} \end{bmatrix} \quad (16)$$

Likewise, the electronic device may convert XYZ values of the reference white point (in this embodiment of this application, an example in which a reference light source is the D65 light source is used for description) (under the D65 light source, the XYZ values of the reference white point are 0.95047, 1, and 1.08883 respectively) in the XYZ color space into $L_{dst}M_{dst}S_{dst}$ values in the LMS color space based on the formula (16).

After calculating the $L_{dst}M_{dst}S_{dst}$ values of the reference white point and the $L_{src}M_{src}S_{src}$ values of the white point of the light source in the photographing environment, the electronic device may calculate a gain matrix $M_{Gain1}$ of the reference white point and the white point of the light source in the photographing environment in the LMS color space. The electronic device may calculate $M_{Gain1}$ by using a formula (17). The formula (17) is shown below:

$$M_{Gain1} = \begin{bmatrix} L_{dst}/L_{src} & 0 & 0 \\ 0 & M_{dst}/M_{src} & 0 \\ 0 & 0 & S_{dst}/S_{src} \end{bmatrix} \quad (17)$$

After calculating the gain matrix $M_{Gain1}$, the electronic device may calculate the LMS values, namely, the $L_{cur}M_{cur}S_{cur}$ values, of the target white point in the LMS based on $M_{Gain1}$ and the degree D of adaptation. The electronic device may calculate the $L_{cur}M_{cur}S_{cur}$ values by using a formula (18), and calculate XYZ values, namely, $X_{cur}Y_{cur}Z_{cur}$ values, of the target white point in the XYZ color space by using a formula (19). The formula (18) and the formula (19) are shown below:

$$\begin{bmatrix} L_{cur} \\ M_{cur} \\ S_{cur} \end{bmatrix} = (D \cdot M_{Gain1} + 1 - D) \times Mcat_1 \times \begin{bmatrix} X_{src} \\ Y_{src} \\ Z_{src} \end{bmatrix} \quad (18)$$

$$\begin{bmatrix} X_{cur} \\ Y_{cur} \\ Z_{cur} \end{bmatrix} = Mcat_1^{-1} \times \begin{bmatrix} L_{cur} \\ M_{cur} \\ S_{cur} \end{bmatrix}, \text{ where} \quad (19)$$

$$(D \cdot M_{Gain1} + 1 - D)$$

is a gain matrix of the white point of the light source in the photographing environment and the reference white point in the LMS color space when the degree of chromatic adaptation is D.

Step S803: The electronic device calculates a chromatic adaptation conversion matrix CA based on the $L_{cur}M_{cur}S_{cur}$ values of the target white point and the $L_{dst}M_{dst}S_{dst}$ values of the reference white point.

Specifically, the $L_{dst}M_{dst}S_{dst}$ values are LMS values of the reference white point in the LMS color space. The electronic device may calculate the chromatic adaptation conversion matrix CA based on a formula (20). The chromatic adaptation conversion matrix CA is a second parameter. The formula (20) is shown below:

$$CA = \begin{bmatrix} L_{cur}/L_{dst} & 0 & 0 \\ 0 & M_{cur}/M_{dst} & 0 \\ 0 & 0 & S_{cur}/S_{dst} \end{bmatrix} \quad (20)$$

The foregoing step S801 to step S803 describe an example of a specific process of calculating a CA matrix by an electronic device. It should be understood that step S801 to step S803 are performed after the electronic device calculates the Chromaticity information of the white point of the light source in the photographing environment by using the white balance algorithm (after the electronic device performs step S701) and before the electronic device performs chromatic adaptation processing on the third image. It can be understood that, it can be learned based on the calculation process that the chromatic adaptation conversion matrix CA is a parameter related to the LMS color space, the chromatic adaptation conversion matrix CA has a correspondence with the $x_1$ value and the $y_1$ value, and the chromatic adaptation conversion matrix CA can identify light source information of an ambient light source in the LMS color space during photographing. Because the LMS color space has a conversion relationship with the XYZ color space, it can be understood that the chromatic adaptation conversion matrix CA is also a parameter related to the XYZ color space, and the chromatic adaptation conversion matrix CA can identify light source information of an ambient light source in the XYZ color space during photographing.

After the electronic device calculates the CA matrix, the electronic device may adjust LMS values of the third image by using the CA matrix to obtain the chromatically adapted fourth image. For example, the electronic device may adjust the LMS values of the third image in the LMS color space by using a formula (21) to obtain the fourth image. The formula (21) is shown below:

$$\begin{bmatrix} L_{4i} \\ M_{4i} \\ S_{4i} \end{bmatrix} = CA \cdot \begin{bmatrix} L_{3i} \\ M_{3i} \\ S_{3i} \end{bmatrix}, \text{where} \quad (21)$$

$$\begin{bmatrix} L_{3i} \\ M_{3i} \\ S_{3i} \end{bmatrix}$$

are LMS values of the i-th pixel of the third image in the LMS color space, and $$\begin{bmatrix} L_{4i} \\ M_{4i} \\ S_{4i} \end{bmatrix}$$

are LMS values of the i-th pixel of the fourth image in the LMS color space.

Step S707: The electronic device converts the fourth image from the LMS color space to the XYZ color space to obtain a second converted image.

For example, the electronic device may convert the fourth image from the LMS color space to the XYZ color space by using a formula (22) to obtain the second converted image. The formula (22) is shown below:

$$\begin{bmatrix} X_{5i} \\ Y_{5i} \\ Z_{5i} \end{bmatrix} = Mcat_2 \cdot \begin{bmatrix} L_{4i} \\ M_{4i} \\ S_{4i} \end{bmatrix}, \text{where} \quad (22)$$

$$\begin{bmatrix} X_{5i} \\ Y_{5i} \\ Z_{5i} \end{bmatrix}$$

are XYZ values of the i-th pixel of the second converted image in the XYZ color space, and Mcat z is an LMS-to-XYZ matrix, and is used to convert an image from the LMS color space to the XYZ color space. For example, $Mcat_2$ may be as follows:

$$Mcat_2 = \begin{bmatrix} 0.9869929 & -0.1470543 & 0.1599627 \\ 0.4323053 & 0.5183603 & 0.0492912 \\ -0.0085287 & 0.0400428 & 0.9684867 \end{bmatrix}$$

Step S708: The electronic device converts the second converted image from the XYZ color space to the sRGB color space to obtain a third converted image.

Specifically, the second converted image is an image in the XYZ color space under the target white point. The electronic device needs to convert the second converted image from the XYZ color space to the sRGB color space to obtain the third converted image, so that the electronic device can subsequently perform gamma correction processing, tone mapping or other image processing steps on the third converted image. For example, the electronic device may convert the third image from the XYZ color space to the sRGB color space by using a formula (23). The formula (23) is shown below:

$$\begin{bmatrix} R_{6i} \\ G_{6i} \\ B_{6i} \end{bmatrix} = M_2 \times \begin{bmatrix} X_{5i} \\ Y_{5i} \\ Z_{5i} \end{bmatrix}, \text{where} \quad (23)$$

$$\begin{bmatrix} X_{5i} \\ Y_{5i} \\ Z_{5i} \end{bmatrix}$$

are the XYZ values of the i-th pixel of the second converted image in the XYZ color space, $$\begin{bmatrix} R_{6i} \\ G_{6i} \\ B_{6i} \end{bmatrix}$$

are RGB values of the i-th pixel of the third converted image in the sRGB color space, $M_2$ is a conversion matrix for converting an image from the XYZ color space to the sRGB color space, and $M_2$ may be as follows:

$$M_2 = \begin{bmatrix} 3.240454 & 1.53713851 & 0.498531409 \\ -0.9692660305 & 1.87601084 & 0.0415560 \\ 0.556434 & 0.204025913 & 1.057225 \end{bmatrix}$$

Step S709: The electronic device performs RGB color space image processing on the third converted image to obtain a fourth converted image.

Specifically, the RGB color space image processing includes performing DRC (dynamic range compression) processing and/or gamma (GAMMA) processing on the third converted image.

Step S710: The electronic device converts the fourth converted image from the sRGB color space to a YUV color space to obtain a fifth converted image.

Step S711: The electronic device performs YUV color space processing on the fifth converted image to obtain a target image.

Specifically, the YUV color space image processing includes performing tone mapping processing (Tone mapping processing) and/or 3D LUT processing on the image.

In a possible implementation, after performing YUV color space processing on the fifth converted image, the electronic device may convert a processed image into a JPEG format to obtain the target image.

The foregoing step S701 to step S711 describe a specific process of performing, by the electronic device, chromatic adaptation processing on an image.

In a possible implementation, the electronic device calculates the Chromatic adaptation conversion matrix CA by querying a correlated color temperature shift table (CCT Shift Table) and a $D_{uv}$ shift table ($D_{uv}$ Shift Table); performs chromatic adaptation on the third image based on the CA to obtain the fourth image; converts the fourth image from the LMS color space to the sRGB color space to obtain the third converted image; and then performs a series of image processing on the third converted image to obtain the target image.

Figure 9:
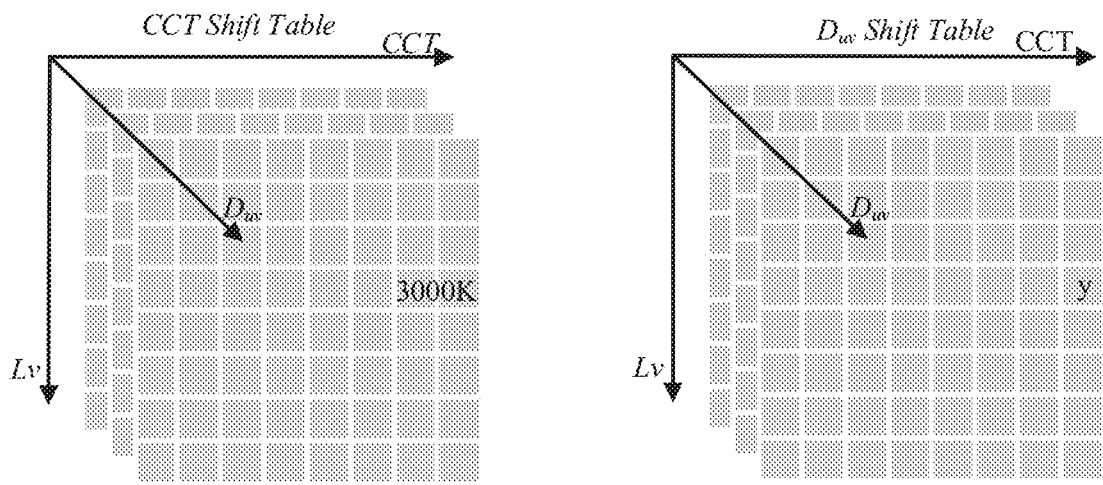
FIG. 9 shows a group of example CCT shift table and $D_{uv}$ shift table according to an embodiment of this application.

The electronic device may find a correlated color temperature $CCT_{cur}$ of the target white point and $D_{uv}$ of the target white point, namely, $D_{uv\_cur}$, in a preset CCT shift table (CCT Shift Table) and $D_{uv}$ shift table ($D_{uv}$ Shift Table) by using a correlated color temperature $CCT_{src}$ of the light source in the photographing environment and $D_{uv}$ of the white point of the light source in the photographing environment, namely, $D_{uv\_src}$. Then the electronic device calculates the $L_{cur}M_{cur}S_{cur}$ values of the target white point by using a conversion relationship between a CCT, $D_{uv}$, and XYZ values, to calculate the CA matrix; adjusts the third image based on the CA matrix; and then obtains the third converted image in the sRGB color space based on the third image. The CCT shift table and the $D_{uv}$ shift table are shown in FIG. 9. FIG. 9 shows a group of example CCT shift table and $D_{uv}$ shift table according to an embodiment of this application.

The electronic device may build a three-dimensional correlated color temperature shift table (CCT Shift Table) and $D_{uv}$ shift table ($D_{uv}$ Shift Table) based on the foregoing formula (7) to formula (19) and related conversion formulas of a CCT, $D_{uv}$, and XYZ values; and may obtain $CCT_{cur}$ and $D_{uv\_cur}$ from the CCT shift table and the $D_{uv}$ shift table by using Lv, $CCT_{src}$, and $D_{uv\_src}$ of the light source in the photographing environment, and then obtain the $x_1$ value and the $y_1$ value by using a formula for conversion from $CCT_{cur}$ and $D_{uv\_cur}$ to the $x_1$ value and the $y_1$ value, so as to calculate the $X_{cur}Y_{cur}Z_{cur}$ values of the target white point in the XYZ color space based on the $x_1$ value and the $y_1$ value.

The electronic device may calculate $D_{uv\_src}$ of the white point of the light source in the photographing environment based on the $x_1$ value and the $y_1$ value. It should be understood that there are a plurality of calculation methods for $D_{uv\_src}$. This embodiment of this application describes only one of the calculation methods for $D_{uv\_src}$ as an example. A specific method used by the electronic device to calculate $D_{uv\_src}$ is not limited in this embodiment of this application. A specific method for calculating $D_{uv\_src}$ by the electronic device is as follows:

The electronic device may calculate a $u_1$ value and a $v_1$ value of the white point of the light source in the photographing environment in a uv chromaticity diagram based on a formula (24) and a formula (25) respectively. The formula (24) and the formula (25) are shown below:

$$u_1 = (4 \times x_1)/(-2 \times x_1 + 12 \times y_1 + 3) \quad (24)$$

$$v_1 = (6 \times y_1)/(-2 \times x_1 + 12 \times y_1 + 3) \quad (25)$$

Then the electronic device may calculate a third parameter $L_{Fp}$, a fourth parameter $a_1$, and a fifth parameter $L_{BB}$ based on a formula (26) to a formula (28). The formula (26) to the formula (28) are shown below:

$$L_{Fp} = \sqrt{(u_1 - 0.292)^2 + (v_1 - 0.24)^2} \quad (26)$$

$$a_1 = \arctan((v_1 - 0.24)/(u_1 - 0.292)) \quad (27)$$

$$L_{BB} = k_{06} \times a^6 + k_{05} \times a^5 + k_{04} \times a^4 + k_{03} \times a^3 + k_{02} \times a^2 + k_{01} \times a + k_{00} \quad (28), \text{ where}$$

$k_{06}$, $k_{05}$, $k_{04}$, $k_{03}$, $k_{02}$, $k_{01}$, and $k_{00}$ are constants; and when $a_1$ is greater than or equal to 0, $a = a_1$; or when $a_1$ is less than or equal to 0, $a = a_1 + \pi$.

Finally, the electronic device may calculate $D_{uv\_src}$ by using a formula (29). The formula (29) is shown below:

$$D_{uv\_src} = L_{Fp} - L_{BB} \quad (29)$$

After calculating $D_{uv\_src}$, the electronic device may calculate the correlated color temperature $CCT_{src}$ of the white point of the light source in the photographing environment based on a formula (30). The formula (30) is shown below:

$$CCT_{src} = T_2 - \Delta T_{c2} \quad (30), \text{ where}$$

$T_2 = T_1 - \Delta T_{c1}$; when a is less than 2.54:

$$T_1 = 1/(k_{16} \times a^6 + k_{15} \times a^5 + k_{14} \times a^4 + k^{13} \times a^3 + k_{12} \times a^2 + k_{11} \times a + k_{10});$$

$$\Delta T_{c1} = (k_{36} \times a^6 + k_{35} \times a^5 + k_{34} \times a^4 + k_{33} \times a^3 + k_{32} \times a^2 k_{31} \times a + k_{30}) \times (L_{BB} + 0.01)/L_{Fp} \times D_{uv\_cur}/0.01; \text{ or}$$

when a is greater than or equal to 2.54:

$$T_1 = 1/(k_{26} \times a^6 + k_{25} \times a^5 + k_{24} \times a^4 + k_{23} \times a^3 + k_{22} \times a^2 k_{21} \times a + k_{20});$$

$$\Delta T_{c1} = (k_{46} \times a^6 + k_{45} \times a^5 + k_{44} \times a^4 + k_{43} \times a^3 + k_{42} \times a^2 + k_{41} \times + k_{40}) \times (L_{BB} + 0.01)/L_{Fp} \times D_{uv\_cur}/0.01; \text{ and}$$

when $D_{uv\_src}$ is greater than or equal to 0:

$$T_{c2} = (k_{56} \times c^6 + k_{55} \times c^5 + k_{54} \times c^4 + k_{53} \times c^3 + k_{52} \times c^2 k_{51} \times c + k_{50}); \text{ or}$$

when $D_{uv\_src}$ is less than 0:

$$\Delta T_{c2}(k_{66} \times c^6 + k_{65} \times c^5 + k_{64} \times c^4 + k_{63} \times c^3 + k_{62} \times c^2 + k_{61} \times c + K_{60}) \cdot |D_{uv\_src}/0.03|^2, \text{ where}$$

$c = \log(T_2)$, and $k_{10}$ to $k_{16}$, $K_{20}$ to $k_{26}$, $k_{30}$ to $k_{36}$, $k_{40}$ to $k_{46}$ $k_{50}$ to $k_{56}$, and $k_{60}$ to $k_{66}$ are constants.

It should be understood that there are a plurality of calculation methods for $CCT_{src}$. This embodiment of this application describes only one of the calculation methods as an example. A calculation method fir $CCT_{src}$ is not limited in this embodiment of this application.

Likewise, the electronic device may calculate $D_{uv\_cur}$ of the target white point by using the $D_{uv}$ shift table. Then the electronic device may calculate the $X_{cur}Y_{cur}Z_{cur}$ values of the target white point in the XYZ color space by using $CCT_{cur}$ and $D_{uv\_cur}$.

The following describes an example of calculating, by the electronic device, the $X_{cur}Y_{cur}Z_{cur}$ values of the target white point in the XYZ color space by using $CCT_{cur}$ and $D_{uv\_cur}$.

Figure 10:
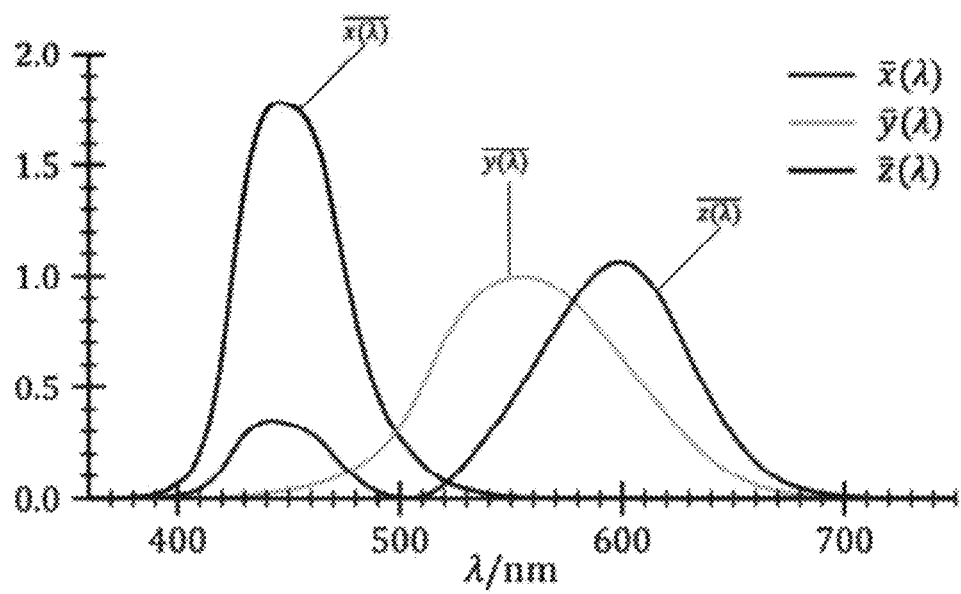
FIG. 10 is a diagram of a CIE1931 xyz labeled observer curve according to an embodiment of this application.

The electronic device may obtain a black body radiation curve $L(\lambda)$ whose color temperature is $CCT_{cur}$ based on a formula (31). The formula (31) is shown below:

$$L(\lambda) = \frac{\lambda^{-5} * c_1}{\pi} \left[ \exp\left(\frac{c_2}{\lambda * CCT_{cur}}\right) - 1 \right]^{-1}, \quad (31)$$

where $c_1$ is a first constant, $c_2$ is a second constant, and $\lambda$ is a wavelength. Then the electronic device calculates an $x_2$ value and a $y_2$ value of black body radiation light when the color temperature is $CCT_{cur}$. A specific process is as follows: The electronic device may calculate XYZ values of the black body radiation light in the XYZ color space based on a formula (32) to a formula (34). The formula (31) to the formula (33) are shown below:

$$X_2 = k\int_{380}^{780} L(\lambda) \times \overline{x(\lambda)}d\lambda; \quad (32)$$

$$Y_2 = k\int_{380}^{780} L(\lambda) \times \overline{y(\lambda)}d\lambda; \quad (33)$$

$$Z_2 = k\int_{380}^{780} L(\lambda) \times \overline{z(\lambda)}d\lambda, \quad (34)$$

where $X_2$ is an X value of the black body radiation light in the XYZ color space, $Y_2$ is a Y value of the black body radiation light in the XYZ color space, $Z_2$ is a Z value of the black body radiation light in the XYZ color space, k is a constant, and $\overline{x(\lambda)}$, $\overline{y(\lambda)}$, and $\overline{z(\lambda)}$ are respectively an x curve, a y curve, and a z curve in a CTE1931 xyz labeled observer curve, where the CTE1931 xyz labeled observer curve is shown in FIG. 10.

Then the electronic device may calculate an $x_2$ value and a $y_2$ value of the black body radiation light in the xy chromaticity diagram based on $X_2Y_2Z_2$. For calculation formulas for the $x_2$ value and the $y_2$ value, refer to the foregoing formula (9) and formula (10). Details are not described herein again in this embodiment of this application.

Then the electronic device converts the $x_2$ value and the $y_2$ value into a $u_2$ value and a $v_2$ value in the uv chromaticity diagram. For calculation formulas for the $u_2$ value and the $v_2$ value, refer to the foregoing formula (24) and formula (25). Details are not described herein again in this embodiment of this application.

Likewise, the electronic device may calculate, based on the foregoing Formula (31), a black body radiation curve $L_1(\lambda)$ whose color temperature is $CCT_{cur}$ (in this embodiment of this application, an example in which Delta_T is 0.01 is used for description), to calculate a $u_3$ value and a $v_3$ value of the black body radiation light whose color temperature is $CCT_{cur}$+Delta_T in the CIE uv chromaticity diagram.

Then the electronic device may calculate a $u_{cur}$ value and a $v_{cur}$ value of the target white point in the CIE uv chromaticity diagram based on a formula (35) and a formula (36). The formula (35) and the formula (36) are shown below:

$$u_{cur} = u_2 - D_{uv\_cur} \times \sin\theta; \quad (35)$$

$$v_{cur} = v_2 + D_{uv\_cur} \times \cos\theta, \quad (36)$$

where $\sin\theta = dv/\sqrt{du^2 + dv^2}$, $\cos\theta = du/\sqrt{du^2 + dv^2}$, $du = u_2 - u_3$, and $dv = v_2 - v_3$.

Then the electronic device may calculate an $x_{cur}$ value and a $y_{cur}$ value of the target white point in the CIE xy chromaticity diagram based on a formula (37) and a formula (38). The formula (37) and the formula (38) are shown below:

$$x_{cur}=9u_{cur}/(6u_{cur}-24v_{cur}+12) \quad (37);$$

$$y_{cur}=3v_{cur}/(3u_{cur}-12v_{cur}+6) \quad (38)$$

The electronic device may calculate $X_{cur}Y_{cur}Z_{cur}$ of the target white point based on the $x_{cur}$ value and the $y_{cur}$ value. For a process and a method of calculating $X_{cur}Y_{cur}Z_{cur}$ by the electronic device based on the x cur value and the $y_{cur}$ value, refer to related descriptions of calculating, by the electronic device, the $X_{src}Y_{src}Z_{src}$ values of the white point of the light source in the photographing environment in the XYZ color space based on the $x_1$ value and the $y_1$ value of the white point of the light source in the photographing environment in the CIE xy chromaticity diagram in step S802. Details are not described herein again in this embodiment of this application.

After calculating $X_{cur}Y_{cur}Z_{cur}$, the electronic device may convert $X_{cur}Y_{cur}Z_{cur}$ into $L_{cur}M_{cur}S_{cur}$, and convert $X_{cur}Y_{cur}Z_{cur}$ into $L_{cur}M_{cur}S_{cur}$. Refer to the foregoing formula (16). Details are not described herein again in this embodiment of this application. After calculating $L_{cur}M_{cur}S_{cur}$, the electronic device may calculate the CA matrix according to the method described in step S803, and then adjust the third image by using the CA matrix based on the foregoing formula (21) to obtain the fourth image.

Finally, the electronic device performs step S707 to step S711 to obtain the target image.

In a possible implementation, the electronic device may perform Chromatic adaptation processing on the third image in the LMS color space by using a nonlinear method. The following describes an example of performing, by the electronic device, chromatic adaptation processing on the third image in the LMS color space by using a nonlinear method. The electronic device may calculate the $L_{cur}M_{cur}S_{cur}$ values of the target white point in the LMS color space by using the following formulas:

$$L_{cur}=[D(L_{dst}/L_{src})+1-D]\cdot L_{src};$$

$$M_{cur}=[D(M_{dst}/M_{src})+1-D]\cdot M_{src};$$

$$S_{cur}=[D(S_{dst}/S_{src}^\tau)+1-D]\cdot S_{src}^\tau, \text{ where}$$

$\tau=(S_{dst}/S_{src})^{0.0834}$. Then the electronic device may adjust the LMS values of the third image in the LMS color space by using the following formulas to obtain the fourth image:

$$L_{4i}=(L_{cur}/L_{dst})\cdot L_{3i};$$

$$M_{4i}=(M_{cur}/M_{dst})\cdot M_{3i};$$

$$S_{4i}=(S_{cur}/S_{dst}^{\tau 1})\cdot S_{3i}^{\tau 1}, \text{ where}$$

$\tau 1=(S_{cur}/S_{dst})^{0.0834}$.

Then the electronic device performs step S707 to step S711 to obtain the target image.

In this embodiment of this application, the electronic device calculates the chromaticity information of the light source in the photographing environment by using the white balance algorithm; performs white balance processing and color restoration on an image to obtain a processed image, where the processed image is an image under the reference light source; and converts the image to the LMS color space. Then the electronic device calculates the chromatic adaptation conversion matrix based on the chromaticity information of the light source in the photographing environment and the chromatic adaptation algorithm, and adjusts the image in the LMS color space by using the chromatic adaptation conversion matrix, to obtain a chromatically adapted image close to a visual effect of human eyes when the degree D of chromatic adaptation is 1, obtain a chromatically adapted image close to a visual effect of human eyes when the degree D of chromatic adaptation is 0, and obtain a chromatically adapted image close to a visual effect of human eyes when the degree D of chromatic adaptation is between 0 and 1.

Figure 11A:
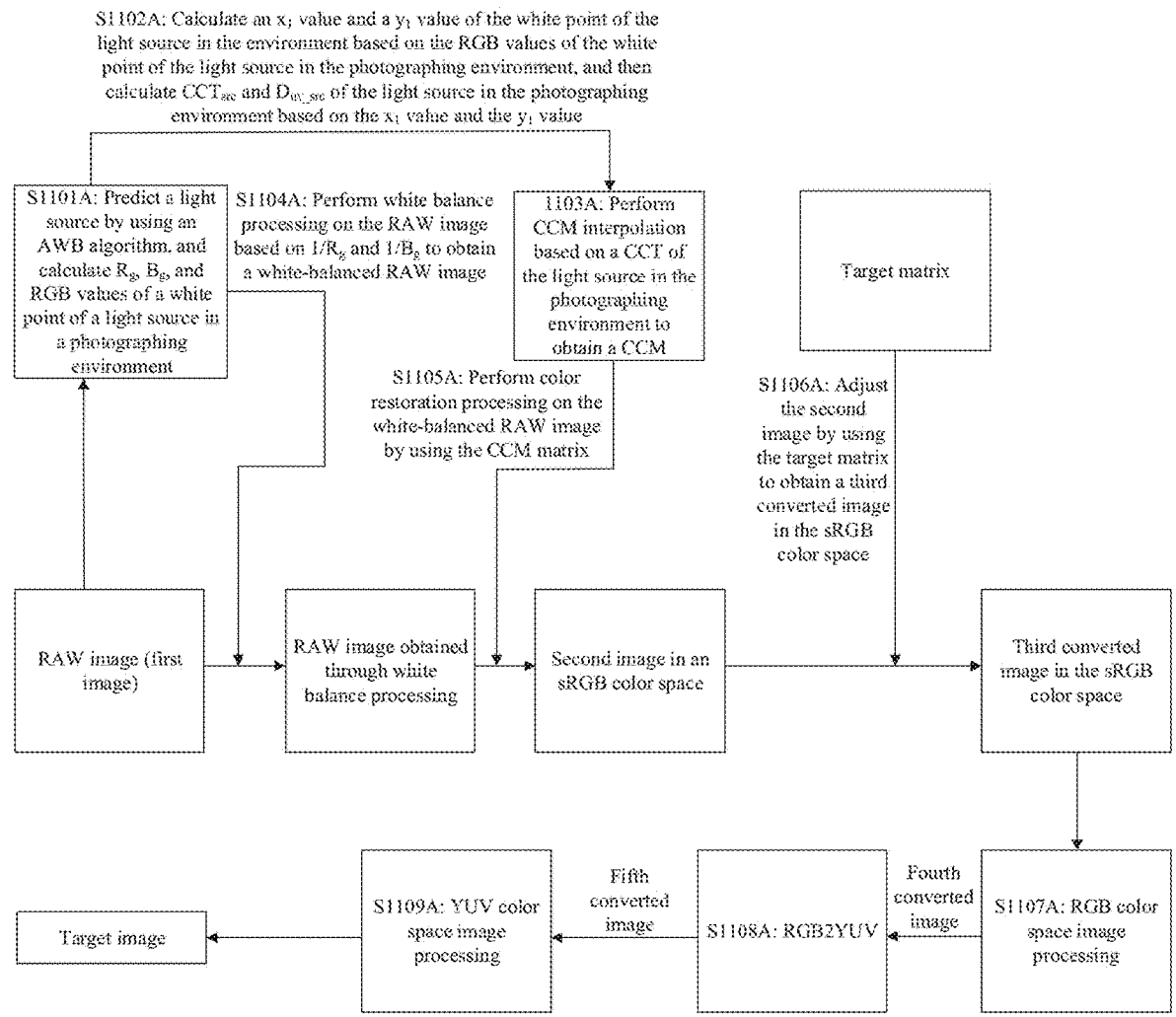
FIG. 11A is another block diagram of image processing according to an embodiment of this application.

The foregoing embodiment of FIG. 7 describes a flowchart of performing, by an electronic device, chromatic adaptation processing on an image. In some embodiments, an electronic device may adjust a second image in an sRGB color space by using a target matrix to obtain a chromatically adapted third converted image in the sRGB color space, and perform a series of related image processing on the third converted image to finally obtain a target image. The following describes, with reference to FIG. 11A, steps of adjusting, by an electronic device, a second image by using a target matrix. FIG. 11A is another block diagram of image processing according to an embodiment of this application. A specific process is as follows:

Step S1101A: The electronic device predicts a light source by using a RAW image output by a camera, and calculates $R_g$ and $B_g$ of a white point of a light source in a photographing environment and RGB values of the white point of the light source in the photographing environment.

Step S1102A: The electronic device calculates an $x_1$ value and a $y_1$ value of the white point of the light source in the environment based on the RGB values of the white point of the light source in the photographing environment, and then calculates $CCT_{src}$ and $D_{uv\_src}$ of the light source in the photographing environment based on the $x_1$ value and the $y_1$ value.

Step S1103A: The electronic device performs CCM interpolation based on the CCT of the light source in the photographing environment to obtain a color correction matrix CCM.

Step S1104A: The electronic device performs white balance processing on the RAW image based on $1/R_g$ and $1/B_g$ to obtain a RAW image obtained through white balance processing.

Step S1105A: The electronic device performs, by using the CCM, color restoration processing on the RAW image obtained through white balance processing to obtain a second image in an sRGB color space.

For step S1101A to step S1105A, refer to related descriptions of step S601 to step S605. Details are not described again in this embodiment of this application.

Step S1106A: The electronic device adjusts the second image by using a target matrix to obtain a third converted image in the sRGB color space.

Specifically, the electronic device may adjust the second image by using a formula (39) to obtain the third converted image. The formula (39) is shown below:

$$\begin{bmatrix} R_{6i} \\ G_{6i} \\ B_{6i} \end{bmatrix} = CA_1 \times \begin{bmatrix} R_{2i} \\ G_{2i} \\ B_{2i} \end{bmatrix}, \text{ where } \begin{bmatrix} R_{2i} \\ G_{2i} \\ B_{2i} \end{bmatrix} \quad (39)$$

are RGB values of the i-th pixel of the second image, $$\begin{bmatrix} R_{6i} \\ G_{6i} \\ B_{6i} \end{bmatrix}$$

are RGB values of the i-th pixel of the third converted image in the sRGB color space, and $CA_1$ is the target matrix.

For example, $CA_1 = M_2 \cdot Mcat_2 \cdot CA \cdot Mcat_1 \cdot M_1$, where $M_1$ is a conversion matrix for conversion from the sRGB color space to an XYZ color space. $M_2$ is a conversion matrix for conversion from the XYZ color space to the sRGB color space, $Mcat_1$ is a conversion matrix for conversion from the XYZ color space to an LMS color space, $Mcat_2$ is a conversion matrix for conversion from the LMS color space to the XYZ color space, CA is a chromatic adaptation conversion matrix, and CA may be obtained by using the foregoing formula (7) to formula (20). Details are not described herein again in this embodiment of this application.

Step S1107A: The electronic device performs RGB color space image processing on the third converted image to obtain a fourth converted image. Specifically, the RGB color space image processing includes performing DRC (dynamic range compression) processing and/or gamma (GAMMA) processing on the third converted image.

Step S1108A: The electronic device converts the fourth converted image from the sRGB color space to a YIN color space to obtain a fifth converted image.

Step S1109A: The electronic device performs YIN color space processing on the fifth converted image to obtain a target image.

In a possible implementation, after performing YUV color space processing on the fifth converted image, the electronic device may convert, a processed image into a MEG format to obtain the target image.

For step S1107A to step S1109A, refer to related descriptions of step S709 to step S711. Details are not described again in this embodiment of this application.

Figure 11B:
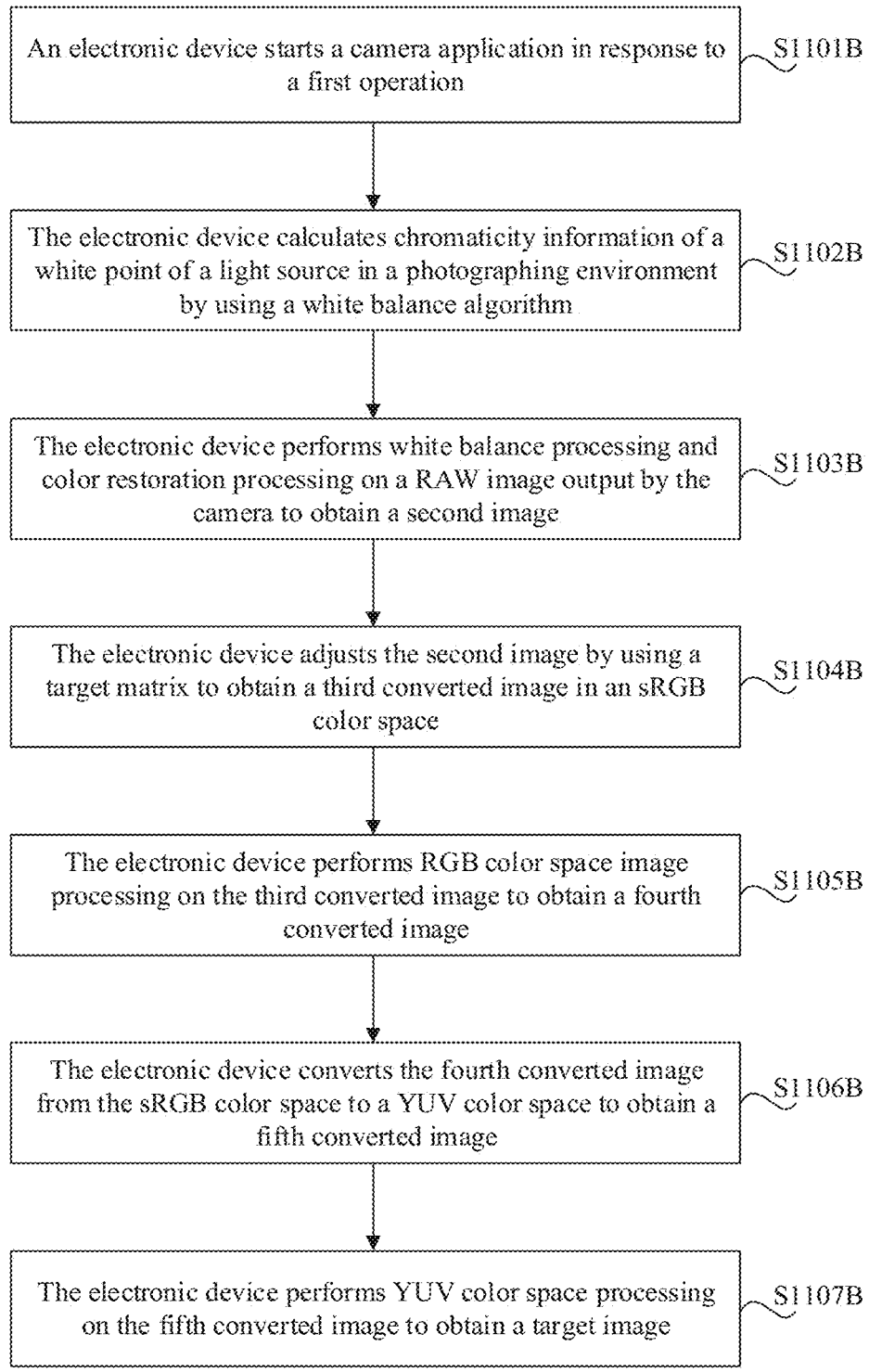
FIG. 11B is a flowchart of another image processing method according to an embodiment of this application.

The following describes in detail the steps in the block diagram of FIG. 11A with reference to FIG. 11B. FIG. 11B is a flowchart of another image processing method according to an embodiment of this application. A specific process is as follows:

Step S1101B: An electronic device starts a camera application in response to a first operation.

Step S1102B: The electronic device calculates chromaticity information of a white point of a light source in a photographing environment by using a white balance algorithm.

Step S1103B: The electronic device performs white balance processing and color restoration processing on the RAW image output by the camera to obtain a second image.

For step S1101B to step S1103B, refer to step S701 to step S703. Details are not described herein again in this embodiment of this application.

Step S1104B: The electronic device adjusts the second image b using a target matrix to obtain a third converted image in an sRGB color space.

For step S1104B, refer to related descriptions of step S1106A. Details are not described herein again in this embodiment of this application.

Step S1105B: The electronic device performs RGB color space image processing on the third converted image to obtain a fourth converted image.

Step S1106B: The electronic device converts the fourth converted image from the sRGB color space to a YUV color space to obtain a fifth converted image.

Step S1107B: The electronic device performs YIN color space processing on the fifth converted image to obtain a target image.

In a possible implementation, after performing YUV color space processing on the fifth converted image, the electronic device may convert a processed image into a MEG format to obtain the target image.

For step S1105B to step S1107B, refer to step S709 to step S711. Details are not described herein again in this embodiment of this application.

In this embodiment of this application, the second image is multiplied by the target matrix to obtain the third converted image that is in the sRGB color space and that is obtained through chromatic adaptation processing, and a series of image processing is performed on the third converted image to obtain a chromatically adapted image close to a visual effect of human eyes, thereby reducing a quantity of times of calculation by the electronic device, and saving computing resources of the electronic device.

Figure 12:
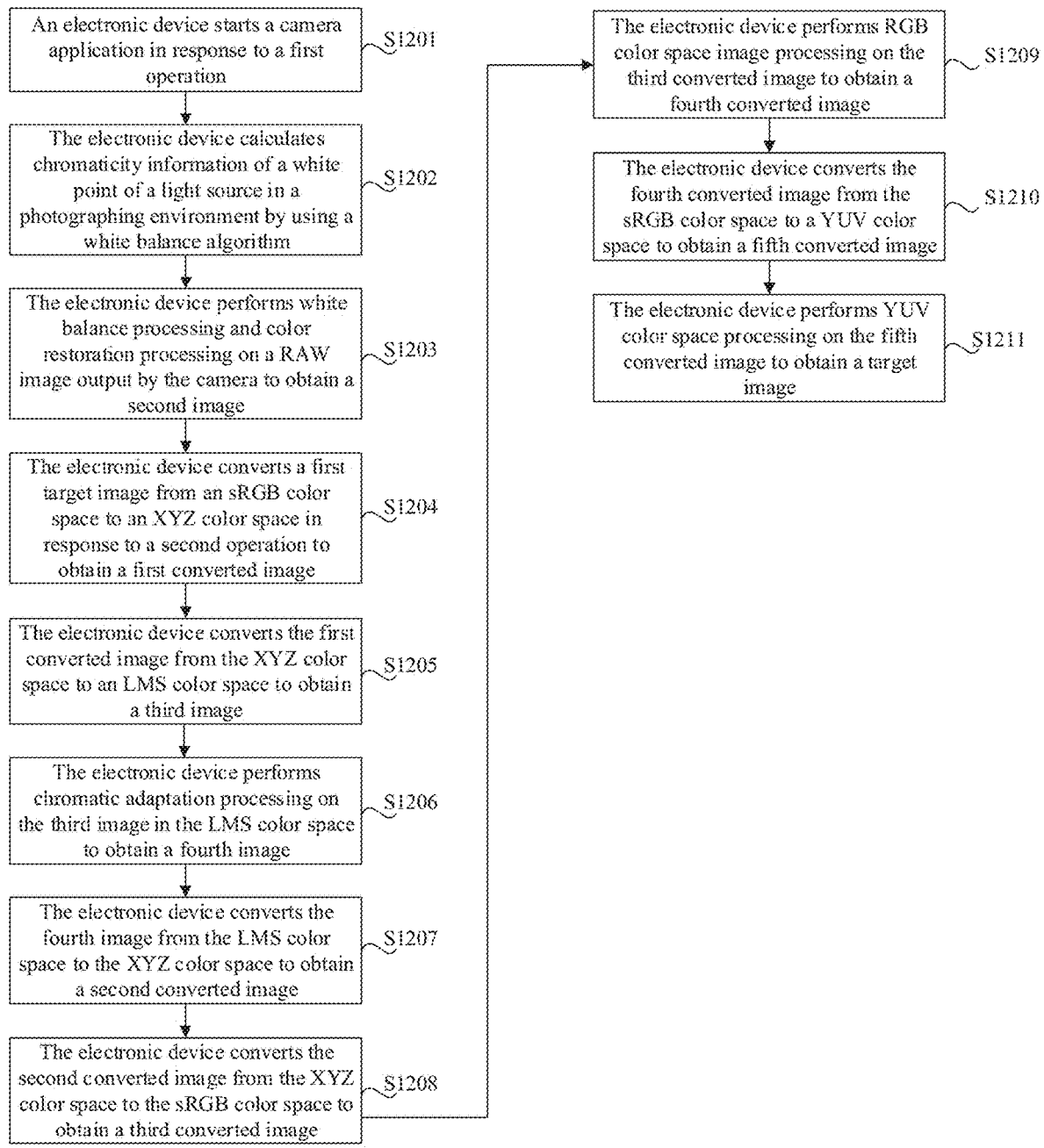
FIG. 12 is a flowchart of another image processing method according to an embodiment of this application.

The following describes, with reference to FIG. 12, a specific process of performing, by the electronic device, chromatic adaptation processing on an image in the foregoing scenario 2. In the scenario 2, after the electronic device starts the camera application, a preview image obtained through white balance processing is displayed on a preview screen. When the electronic device detects a tap operation on the chromatic adaptation processing control on the photographing screen of the camera application, the electronic device performs chromatic adaptation processing on the preview image, and displays a preview image obtained through chromatic adaptation processing on the preview screen. FIG. 12 is a flowchart of another image processing method according to an embodiment of this application. A specific process is as follows:

Step S1201: An electronic device starts a camera application in response to a first operation.

Step S1202: The electronic device calculates chromaticity information of a white point of a light source in a photographing environment by using a white balance algorithm.

Step S1203: The electronic device performs white balance processing and color restoration processing on the RAW image output by the camera to obtain a second image.

For related descriptions of step S1201 to step S1203, refer to related descriptions of step S701 to step S5703. Details are not described again in this embodiment of this application.

Step S1204: The electronic device converts a first target image from an sRGB color space to an XYZ color space in response to a second operation to obtain a first converted image.

Specifically, the second operation may be the tap operation on the chromatic adaptation processing control 404 in FIG. 4A, and the first target image is a current image obtained by the electronic device by performing white balance processing and color restoration processing.

Step S1205: The electronic device converts the first converted image from the XYZ color space to an LMS color space to obtain a third image.

Step S1206: The electronic device performs chromatic adaptation processing on the third image in the LMS color space to obtain a fourth image.

Step S1207: The electronic device converts the fourth image from the LMS color space to the XYZ color space to obtain a second converted image.

Step S1208: The electronic device converts the second converted image from the XYZ color space to the sRGB color space to obtain a third converted image.

Step S1209: The electronic device performs RGB color space image processing on the third converted image to obtain a fourth converted image.

Step S1210: The electronic device converts the fourth converted image from the sRGB color space to a YUV color space to obtain a fifth converted image.

Step S1211: The electronic device performs YUV color space processing on the fifth converted image to obtain a target image.

In a possible implementation, after performing YUV color space processing on the fifth converted image, the electronic device may convert a processed image into a MEG format to obtain the target image.

For related descriptions of step S1204 to step S1211, refer to related descriptions of step S704 to step S711. Details are not described again in this embodiment of this application.

Figure 13:
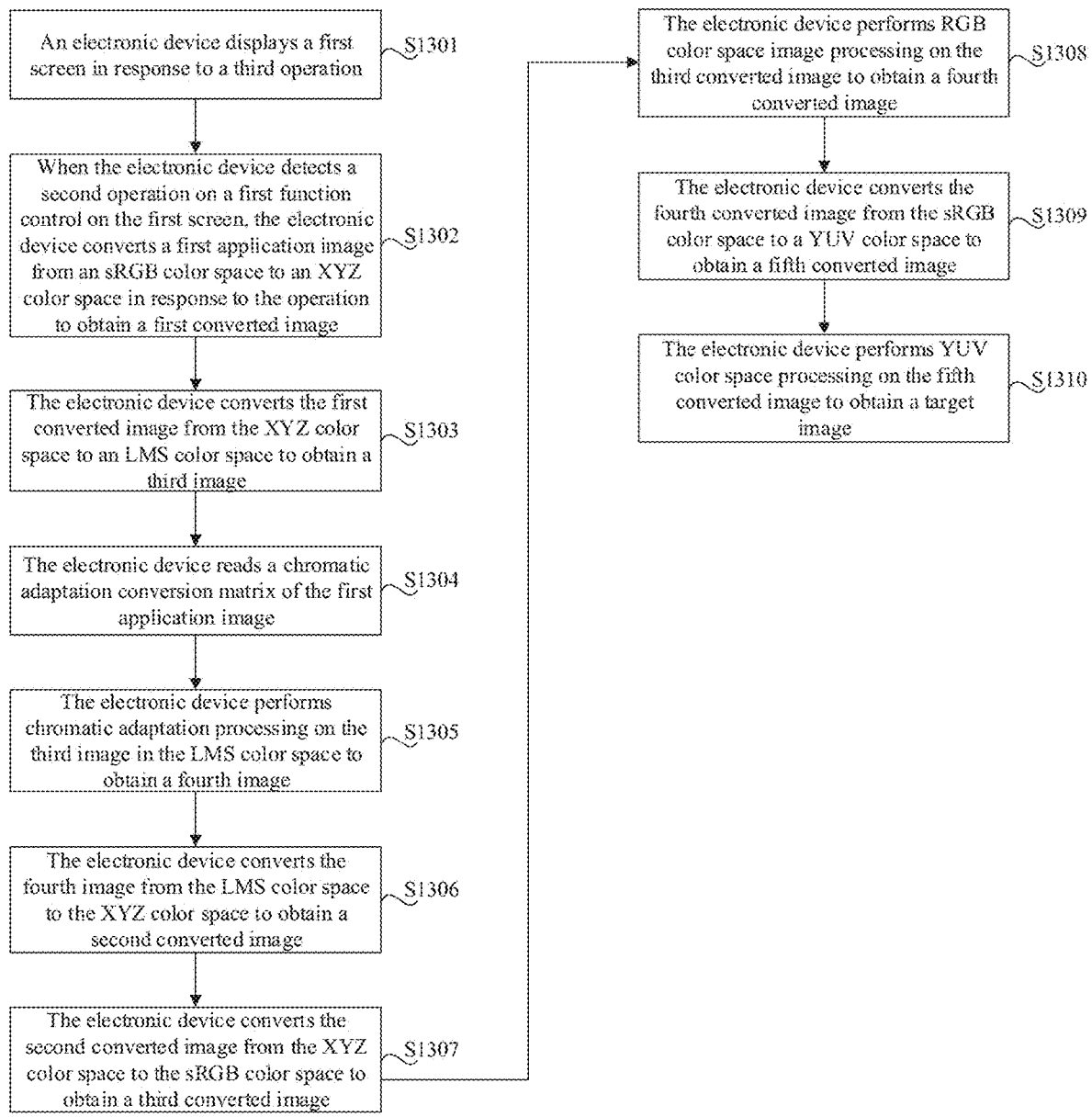
FIG. 13 is a flowchart of another image processing method according to an embodiment of this application.

The following describes, with reference to FIG. 13, a specific process of performing, by the electronic device, chromatic adaptation processing on an image in the foregoing scenario 3. In the scenario 3, after starting the camera, the electronic device calculates a chromatic adaptation conversion matrix for an image; and after a user takes a photo, stores the photo and its corresponding chromatic adaptation conversion matrix. When the user views a photo, if the electronic device detects a tap operation on the chromatic adaptation processing control in the gallery, the electronic device obtains a chromatic adaptation conversion matrix of the photo, and performs chromatic adaptation processing on the photo by using the matrix to obtain the processed photo. FIG. 13 is a flowchart of another image processing method according to an embodiment of this application. A specific process is as follows:

Step S1301: An electronic device displays a first screen in response to a third operation.

Specifically, the third operation may be tapping a first application image in a gallery application, the first application image is a photo taken by a camera, and the first screen may be a viewing screen for the first application image. For example, the viewing screen may be the user interface 52 in the embodiment of FIG. 5C.

Step S1302: When the electronic device detects a second operation on a first function control on the first screen, the electronic device converts the first application image from an sRGB color space to an XYZ color space in response to the operation to obtain a first converted image.

Specifically, the first function control may be the "chromatic adaptation processing" function box in the embodiment of FIG. 5C, and the second operation may be a tap operation on the "chromatic adaptation processing" function box in the embodiment of FIG. 5C. For a process and a method of converting, by the electronic device, the first application image from the sRGB color space to the XYZ color space to obtain the first converted image, refer to related descriptions of converting, by the electronic device, the second image from the sRGB color space to the XYZ color space to obtain the first converted image in step S704 in the embodiment of FIG. 7. Details are not described herein again in this embodiment of this application.

Step S1303: The electronic device converts the first converted image from the XYZ color space to an LMS color space to obtain a third image.

For step S1303, refer to step S705. Details are not described again in this embodiment of this application.

Step S1304: The electronic device reads a chromatic adaptation conversion matrix of the first application image.

Specifically, in a process in which the electronic device performs photographing by using the camera to obtain the first application image, the electronic device calculates the chromatic adaptation conversion matrix CA of the first application image, and stores the first application image and its corresponding chromatic adaptation conversion matrix to an image or an internal memory. When the electronic device needs to perform chromatic adaptation processing on the first application image by using the chromatic adaptation conversion matrix, the electronic device may read the chromatic adaptation conversion matrix. For a method and a process of calculating, by the electronic device, the chromatic adaptation conversion matrix of the first application image in the photographing process, refer to related descriptions in the embodiment of FIG. 8. This is not limited in this embodiment of this application.

It should be understood that step S1304 only needs to be performed before step S1305, and an execution sequence of step S1304 is not limited in this embodiment of this application.

Step S1305: The electronic device performs chromatic adaptation processing on the third image in the LMS color space to obtain a fourth image.

Step S1306: The electronic device converts the fourth image from the LMS space to the XYZ color space to obtain a second converted image.

Step S1307: The electronic device converts the second converted image from the XYZ color space to the sRGB color space to obtain a third converted image.

Step S1308: The electronic device performs RGB color space image processing on the third converted image to obtain a fourth converted image.

Step S1309: The electronic device converts the fourth converted image from the sRGB color space to a YIN color space to obtain a fifth converted image.

Step S1310: The electronic device performs YUV color space processing on the fifth converted image to obtain a target image.

In a possible implementation, after performing YUV color space processing on the fifth converted image, the electronic device may convert a processed image into a JPEG format to obtain the target image.

For related descriptions of step S1305 to step S1310, refer to related descriptions of step S706 to step S711 in the embodiment of FIG. 7. Details are not described again in this embodiment of this application.

All or some of the foregoing embodiments may be implemented by software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, all or some of the processes or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line) or a wireless manner (for example, infrared, radio, or microwave), The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

A person of ordinary skill in the art can understand that all or some of the processes of the methods in the foregoing embodiments may be implemented by a computer program instructing related hardware. The program may be stored in a computer-readable storage medium. When the program is executed, the processes in the foregoing method embodiments may be included. The storage medium includes any medium that can store computer program code, for example, a ROM, a random access memory RAM, a magnetic disk, or an optical disc.

To sum up, the foregoing descriptions are merely embodiments of the technical solutions of the present invention, but are not intended to limit the protection scope of the present invention. Any modification, equivalent replacement, or improvement made based on the disclosure of the present invention shall fall within the protection scope of the present invention.

What is claimed is:

1. An image processing method, comprising:
starting a camera of an electronic device in response to a first operation;
acquiring a first image under a first ambient light source in response to a second operation, wherein the first image is an image in a first color space, and the first ambient light source is at least one ambient light source for acquisition of the first image;
adjusting the first image based on a formula $$\begin{bmatrix} R'_{1i} \\ G'_{1i} \\ B'_{1i} \end{bmatrix} = \begin{bmatrix} R_{gain} & 0 & 0 \\ 0 & 1 & 0 \\ 0 & 0 & B_{gain} \end{bmatrix} \cdot \begin{bmatrix} R_{1i} \\ G_{1i} \\ B_{1i} \end{bmatrix}$$

to obtain an adjusted first image, wherein $$\begin{bmatrix} R_{1i} \\ G_{1i} \\ B_{1i} \end{bmatrix}$$

are RGB values of an i-th pixel of the first image, $$\begin{bmatrix} R'_{1i} \\ G'_{1i} \\ B'_{1i} \end{bmatrix}$$

are RGB values of an i-th pixel of the adjusted first image, $R_{gain}=G/R$, $B_{gain}=G/B$, and R, G, and B are RGB values, respectively, of the first ambient light source in the first color space;
adjusting the adjusted first image based on a formula $$\begin{bmatrix} R_{2i} \\ G_{2i} \\ B_{2i} \end{bmatrix} = CCM \cdot \begin{bmatrix} R'_{1i} \\ G'_{1i} \\ B'_{1i} \end{bmatrix}$$

to obtain a second image in a second color space, wherein CCM is a color correction matrix obtained based on a first parameter of the first ambient light source, and $$\begin{bmatrix} R_{2i} \\ G_{2i} \\ B_{2i} \end{bmatrix}$$

are RGB values of the i-th pixel of the second image in the second color space, wherein the second color space is different from the first color space;

obtaining a second parameter based on the first parameter, wherein the second parameter is a parameter related to a third color space, the first parameter comprises an $x_1$ value and a $y_1$ value of the first ambient light source in an xy chromaticity diagram, the second parameter has a correspondence with the first parameter, the second parameter identifies light source information of the first ambient light source in the third color space, the third color space is different from the first color space, and the third color space is different from the second color space;

performing second image processing on the second image based on the second parameter to obtain a target image; and storing the target image.

2. The method of claim 1, wherein obtaining the second parameter based on the first parameter of the first ambient light source comprises:

calculating a degree D of chromatic adaptation based on the first parameter;

calculating, based on the first parameter, LMS values of a white point corresponding to the first ambient light source in the third color space;

calculating a gain matrix based on a formula $$M_{Gain1} = \begin{bmatrix} L_{dst}/L_{src} & 0 & 0 \\ 0 & M_{dst}/M_{src} & 0 \\ 0 & 0 & S_{dst}/S_{src} \end{bmatrix},$$

wherein $L_{dst}$, $M_{dst}$, and $S_{dst}$ are LMS values of a reference white point in the third color space, a light source corresponding to the reference white point is a reference light source, and the $L_{src}$, $M_{src}$, and $S_{src}$ values are the LMS values of the white point corresponding to the first ambient light source in the third color space;

calculating LMS values of a target white point in the third color space based on a formula $$\begin{bmatrix} L_{cur} \\ M_{cur} \\ S_{cur} \end{bmatrix} = (D \cdot M_{Gain1} + 1 - D) \times Mcat_1 \times \begin{bmatrix} X_{src} \\ Y_{src} \\ Z_{src} \end{bmatrix},$$

wherein a light source corresponding to the target white point is a target light source, $$\begin{bmatrix} X_{src} \\ Y_{src} \\ Z_{src} \end{bmatrix}$$

are XYZ values of the white point corresponding to the first ambient light source in an XYZ color space, $$\begin{bmatrix} X_{src} \\ Y_{src} \\ Z_{src} \end{bmatrix}$$

are obtained based on the $L_{src}$, $M_{src}$, and $S_{src}$ values, $Mcat_1$ is a conversion matrix for conversion from the XYZ color space to an LMS color space, and $$\begin{bmatrix} L_{cur} \\ M_{cur} \\ S_{cur} \end{bmatrix}$$

are the LMS values of the target white point in the third color space; and calculating the second parameter based on a formula $$CA = \begin{bmatrix} L_{cur}/L_{dst} & 0 & 0 \\ 0 & M_{cur}/M_{dst} & 0 \\ 0 & 0 & S_{cur}/S_{dst} \end{bmatrix},$$

wherein CA is the second parameter.

3. The method of claim 2, wherein calculating the degree D of chromatic adaptation based on the first parameter comprises:

calculating a first variable based on a formula $P_{xy}=\sqrt{(x_1-x_N)^2+(y_1-y_N)^2}$, wherein $P_{xy}$ is the first variable, $x_N$ is an x value of the reference white point in the xy chromaticity diagram, and $y_N$ is a y value of the reference white point in the xy chromaticity diagram;

calculating a second variable based on a formula $D_c=1-e^{-5.3 \cdot P_{xy}}$, wherein $D_c$ is the second variable; and obtaining the degree D of chromatic adaptation based on a formula $D=0.96 \cdot D_c((1-e^{(-4.28 \cdot \log La)^{406.5}}-1)+1$, wherein La is a lighting value of the first ambient light source.

4. The method of claim 2, wherein calculating, based on the first parameter, LMS values of the white point corresponding to the first ambient light source in the third color space comprises:

calculating a third variable based on a formula $$i_y = \frac{1}{y_1},$$

wherein $i_y$ is the third variable;

calculating XYZ values of the white point corresponding to the first ambient light source in the XYZ color space based on a formula $X_{src}=x_1 \cdot Y_{src} \cdot i_y$ and a formula $Z_{src}=Y_{src} \cdot (1-x_1-y_1) \cdot i_y$, wherein $X_{src}$, $Y_{src}$, and $Z_{src}$ are the XYZ values of the white point corresponding to the first ambient light source in the XYZ color space, $Y_{src}=m$, and m is an image brightness preset on the electronic device; and calculating LMS values of the white point corresponding to the first ambient light source in the third color space based on a formula $$\begin{bmatrix} L_{src} \\ M_{src} \\ S_{src} \end{bmatrix} = Mcat_1 \cdot \begin{bmatrix} X_{src} \\ Y_{src} \\ Z_{src} \end{bmatrix}, \text{ and wherein } \begin{bmatrix} L_{src} \\ M_{src} \\ S_{src} \end{bmatrix}$$

are LMS values of the white point corresponding to the first ambient light source in the third color space.

5. The method of claim 1, wherein performing second image processing on the second image based on the second parameter to obtain the target image comprises:

performing third image processing on the second image to obtain a third image;

performing chromatic adaptation processing on the third image based on a formula $$\begin{bmatrix} L_{4i} \\ M_{4i} \\ S_{4i} \end{bmatrix} = CA \cdot \begin{bmatrix} L_{3i} \\ M_{3i} \\ S_{3i} \end{bmatrix}$$

to obtain a fourth image, wherein CA is the second parameter, $$\begin{bmatrix} L_{3i} \\ M_{3i} \\ S_{3i} \end{bmatrix}$$

are LMS values of the third image in the third color space, and $$\begin{bmatrix} L_{4i} \\ M_{4i} \\ S_{4i} \end{bmatrix}$$

are LMS values of the fourth image in the third color space; and
performing fourth image processing on the fourth image to obtain the target image.

6. The method of claim 5, wherein performing third image processing on the second image to obtain the third image comprises:
converting the second image from the second color space to an XYZ color space based on a formula $$\begin{bmatrix} X_{2i} \\ Y_{2i} \\ Z_{2i} \end{bmatrix} = M_1 \cdot \begin{bmatrix} R_{2i} \\ G_{2i} \\ B_{2i} \end{bmatrix}$$

to obtain a first converted image, wherein $$\begin{bmatrix} R_{2i} \\ G_{2i} \\ B_{2i} \end{bmatrix}$$

are RGB values of an i-th pixel of the second image in the second color space, $M_1$ is a conversion matrix for conversion from the second color space to the XYZ color space, and $$\begin{bmatrix} X_{2i} \\ Y_{2i} \\ Z_{2i} \end{bmatrix}$$

are XYZ values of an i-th pixel of the first converted image in the XYZ color space; and
converting the first converted image from the XYZ color space to the third color space based on a formula $$\begin{bmatrix} L_{3i} \\ M_{3i} \\ S_{3i} \end{bmatrix} = Mcat_1 \cdot \begin{bmatrix} X_{2i} \\ Y_{2i} \\ Z_{2i} \end{bmatrix}$$

to obtain the third image, wherein $Mcat_1$ is a conversion matrix for conversion from the XYZ color space to an LMS color space, and $$\begin{bmatrix} L_{3i} \\ M_{3i} \\ S_{3i} \end{bmatrix}$$

are LMS values of the third image in the third color space.

7. The method of claim 5, wherein performing fourth image processing on the fourth image to obtain the target image comprises:
converting the fourth image from the third color space to an XYZ color space based on a formula $$\begin{bmatrix} X_{5i} \\ Y_{5i} \\ Z_{5i} \end{bmatrix} = Mcat_2 \cdot \begin{bmatrix} L_{4i} \\ M_{4i} \\ S_{4i} \end{bmatrix}$$

to obtain a second converted image, wherein $$\begin{bmatrix} X_{5i} \\ Y_{5i} \\ Z_{5i} \end{bmatrix}$$

are XYZ values of an i-th pixel of the second converted image in the XYZ color space, and $Mcat_2$ is a conversion matrix for conversion from an LMS color space to the XYZ color space;
converting the second converted image from the XYZ color space to the second color space based on a formula $$\begin{bmatrix} R_{6i} \\ G_{6i} \\ B_{6i} \end{bmatrix} = M_2 \times \begin{bmatrix} X_{5i} \\ Y_{5i} \\ Z_{5i} \end{bmatrix}$$

to obtain a third converted image, wherein $M_2$ is a conversion matrix for conversion from the XYZ color space to the second color space, and $$\begin{bmatrix} R_{6i} \\ G_{6i} \\ B_{6i} \end{bmatrix}$$

are RGB values of an i-th pixel of the third converted image in the second color space;
performing RGB color space image processing on the third converted image to obtain a fourth converted image;
converting the fourth converted image from the second color space to a YUV color space to obtain a fifth converted image; and
performing YUV color space processing on the fifth converted image to obtain the target image.

8. The method of claim 1, wherein performing second image processing on the second image based on the second parameter to obtain the target image comprises:
performing fifth image processing on the second image based on a formula $$\begin{bmatrix} R_{6i} \\ G_{6i} \\ B_{6i} \end{bmatrix} = CA_1 \times \begin{bmatrix} R_{2i} \\ G_{2i} \\ B_{2i} \end{bmatrix}$$

to obtain a third converted image, wherein $$\begin{bmatrix} R_{6i} \\ G_{6i} \\ B_{6i} \end{bmatrix}$$

are RGB values of an i-th pixel of the third converted image in the second color space, $$\begin{bmatrix} R_{2i} \\ G_{2i} \\ B_{2i} \end{bmatrix}$$

are RGB values of an i-th pixel of the second image in the second color space, and $CA_1$ is a target matrix;

performing RGB color space image processing on the third converted image to obtain a fourth converted image;

converting the fourth converted image from the second color space to a YUV color space to obtain a fifth converted image; and performing YUV color space processing on the fifth converted image to obtain the target image, wherein $CA1=M_2 \cdot Mcat_2 \cdot CA \cdot Mcat_1 \cdot M_1$, $M_1$ is a conversion matrix for conversion from the second color space to an XYZ color space, $M_2$ is a conversion matrix for conversion from the XYZ color space to the first color space, $Mcat_1$ is a conversion matrix for conversion from the XYZ color space to an LMS color space, $Mcat_2$ is a conversion matrix for conversion from the LMS color space to the XYZ color space, and CA is the second parameter.

9. An electronic device, comprising:

a camera;

one or more processors coupled to the camera; and a non-transitory memory coupled to the processor and configured to store instructions that, when executed by the processor, causes the electronic device to be configured to:

start the camera in response to a first operation;

acquire, by the camera, a first image under a first ambient light source in response to a second operation, wherein the first image is an image in a first color space, and the first ambient light source is at least one ambient light source for acquisition of the first image;

adjust the first image based on a formula $$\begin{bmatrix} R'_{1i} \\ G'_{1i} \\ B'_{1i} \end{bmatrix} = \begin{bmatrix} R_{gain} & 0 & 0 \\ 0 & 1 & 0 \\ 0 & 0 & B_{gain} \end{bmatrix} \cdot \begin{bmatrix} R_{1i} \\ G_{1i} \\ B_{1i} \end{bmatrix}$$

to obtain an adjusted first image, wherein $$\begin{bmatrix} R_{1i} \\ G_{1i} \\ B_{1i} \end{bmatrix}$$

are RGB values of an i-th pixel of the first image, $$\begin{bmatrix} R'_{1i} \\ G'_{1i} \\ B'_{1i} \end{bmatrix}$$

are RGB values of an i-th pixel of the adjusted first image, $R_{gain}$=G/R, $B_{gain}$=G/B, and R, G, and B are RGB values, respectively, of the first ambient light source in the first color space;

adjust the adjusted first image based on a formula $$\begin{bmatrix} R_{2i} \\ G_{2i} \\ B_{2i} \end{bmatrix} = CCM \cdot \begin{bmatrix} R'_{1i} \\ G'_{1i} \\ B'_{1i} \end{bmatrix}$$

to obtain a second image in a second color space, wherein CCM is a color correction matrix obtained based on a first parameter of the first ambient light source, and $$\begin{bmatrix} R_{2i} \\ G_{2i} \\ B_{2i} \end{bmatrix}$$

are RGB values of the i-th pixel of the second image in the second color space, wherein the second color space is different from the first color space;

obtain a second parameter based on the first parameter, wherein the second parameter is a parameter related to a third color space, the first parameter comprises a white balance parameter of the first ambient light source, the second parameter has a correspondence with the first parameter, the second parameter identifies light source information of the first ambient light source in the third color space, the third color space is different from the first color space, and the third color space is different from the second color space;

perform second image processing on the second image based on the second parameter to obtain a target image; and store the target image.

10. The electronic device of claim 9, wherein the first color space is a RAW space, the second color space is an sRGB color space, and the third color space is an LMS color space or an XYZ color space, and wherein the first parameter comprises an $x_1$ value and a $y_1$ value of the first ambient light source in an xy chromaticity diagram.

11. The electronic device of claim 9, wherein obtaining the second parameter based on the first parameter of the first ambient light source comprises:

calculating a degree D of chromatic adaptation based on the first parameter;

calculating, based on the first parameter, LMS values of a white point corresponding to the first ambient light source in the third color space;
calculating a gain matrix based on a formula $$M_{Gain1} = \begin{bmatrix} L_{dst}/L_{src} & 0 & 0 \\ 0 & M_{dst}/M_{src} & 0 \\ 0 & 0 & S_{dst}/S_{src} \end{bmatrix},$$

wherein $L_{dst}$, $M_{dst}$, and $S_{dst}$ are LMS values of a reference white point in the third color space, a light source corresponding to the reference white point is a reference light source, and the $L_{src}$, $M_{src}$, and $S_{src}$ values are the LMS values of the white point corresponding to the first ambient light source in the third color space;

calculating LMS values of a target white point in the third color space based on a formula $$\begin{bmatrix} L_{cur} \\ M_{cur} \\ S_{cur} \end{bmatrix} = (D \cdot M_{Gain1} + 1 - D) \times Mcat_1 \times \begin{bmatrix} X_{src} \\ Y_{src} \\ Z_{src} \end{bmatrix},$$

wherein a light source corresponding to the target white point is a target light source, $$\begin{bmatrix} X_{src} \\ Y_{src} \\ Z_{src} \end{bmatrix}$$

are XYZ values of the white point corresponding to the first ambient light source in an XYZ color space, $$\begin{bmatrix} X_{src} \\ Y_{src} \\ Z_{src} \end{bmatrix}$$

are obtained based on the $L_{src}$, $M_{src}$, and $S_{src}$ values, $Mcat_1$ is a conversion matrix for conversion from the XYZ color space to an LMS color space, and $$\begin{bmatrix} L_{cur} \\ M_{cur} \\ S_{cur} \end{bmatrix}$$

are the LMS values of the target white point in the third color space; and
calculating the second parameter based on a formula $$CA = \begin{bmatrix} L_{cur}/L_{dst} & 0 & 0 \\ 0 & M_{cur}/M_{dst} & 0 \\ 0 & 0 & S_{cur}/S_{dst} \end{bmatrix},$$

wherein CA is the second parameter.

12. The electronic device of claim 11, wherein calculating the degree D of chromatic adaptation based on the first parameter comprises:
calculating a first variable based on a formula $P_{xy} = \sqrt{(x_1-x_N)^2+(y_1-y_N)^2}$, wherein $P_{xy}$ is the first variable, $x_N$ is an x value of the reference white point in an xy chromaticity diagram, and $y_N$ is a y value of the reference white point in the xy chromaticity diagram;

calculating a second variable based on a formula $D_c = 1 - e^{-5.3 \cdot P_{xy}}$, wherein $D_c$ is the second variable; and
obtaining the degree D of chromatic adaptation based on a formula $D = 0.96 \cdot D_c((1-e^{(-4.28 \cdot \log\ La)^{406.5}} - 1) + 1$, wherein La is a lighting value of the first ambient light source.

13. The electronic device of claim 11, wherein calculating, based on the first parameter, LMS values of the white point corresponding to the first ambient light source in the third color space comprises:
calculating a third variable based on a formula $$i_y = \frac{1}{y_1},$$

wherein $i_y$ is the third variable;
calculating XYZ values of the white point corresponding to the first ambient light source in the XYZ color space based on a formula $X_{src} = x_1 \cdot Y_{src} \cdot i_y$ and a formula $Z_{src} = Y_{src} \cdot (1-x_1-y_1) \cdot i_y$, wherein $X_{src}$, $Y_{src}$, and $Z_{src}$ are the XYZ values of the white point corresponding to the first ambient light source in the XYZ color space, $Y_{src} = m$, and m is an image brightness preset on the electronic device; and
calculating LMS values of the white point corresponding to the first ambient light source in the third color space based on a formula $$\begin{bmatrix} L_{src} \\ M_{src} \\ S_{src} \end{bmatrix} = Mcat_1 \cdot \begin{bmatrix} X_{src} \\ Y_{src} \\ Z_{src} \end{bmatrix}, \text{ and wherein } \begin{bmatrix} L_{src} \\ M_{src} \\ S_{src} \end{bmatrix}$$

are LMS values of the white point corresponding to the first ambient light source in the third color space.

14. The electronic device of claim 9, wherein performing second image processing on the second image based on the second parameter to obtain the target image comprises:
performing third image processing on the second image to obtain a third image;
performing chromatic adaptation processing on the third image based on a formula $$\begin{bmatrix} L_{4i} \\ M_{4i} \\ S_{4i} \end{bmatrix} = CA \cdot \begin{bmatrix} L_{3i} \\ M_{3i} \\ S_{3i} \end{bmatrix}$$

to obtain a fourth image, wherein CA is the second parameter, $$\begin{bmatrix} L_{3i} \\ M_{3i} \\ S_{3i} \end{bmatrix}$$

are LMS values of the third image in the third color space, and $$\begin{bmatrix} L_{4i} \\ M_{4i} \\ S_{4i} \end{bmatrix}$$

are LMS values of the fourth image in the third color space; and performing fourth image processing on the fourth image to obtain the target image.

15. The electronic device of claim 14, wherein performing third image processing on the second image to obtain the third image comprises:

converting the second image from the second color space to an XYZ color space based on a formula $$\begin{bmatrix} X_{2i} \\ Y_{2i} \\ Z_{2i} \end{bmatrix} = M_1 \cdot \begin{bmatrix} R_{2i} \\ G_{2i} \\ B_{2i} \end{bmatrix}$$

to obtain a first converted image, wherein $$\begin{bmatrix} R_{2i} \\ G_{2i} \\ B_{2i} \end{bmatrix}$$

are RGB values of an i-th pixel of the second image in the second color space, $M_1$ is a conversion matrix for conversion from the second color space to the XYZ color space, and $$\begin{bmatrix} X_{2i} \\ Y_{2i} \\ Z_{2i} \end{bmatrix}$$

are XYZ values of an i-th pixel of the first converted image in the XYZ color space; and converting the first converted image from the XYZ color space to the third color space based on a formula $$\begin{bmatrix} L_{3i} \\ M_{3i} \\ S_{3i} \end{bmatrix} = Mcat_1 \cdot \begin{bmatrix} X_{2i} \\ Y_{2i} \\ Z_{2i} \end{bmatrix}$$

to obtain the third image, wherein $Mcat_1$ is a conversion matrix for conversion from the XYZ color space to an LMS color space, and $$\begin{bmatrix} L_{3i} \\ M_{3i} \\ S_{3i} \end{bmatrix}$$

are LMS values of the third image in the third color space.

16. The electronic device of claim 14, wherein performing fourth image processing on the fourth image to obtain the target image comprises:

converting the fourth image from the third color space to an XYZ color space based on a formula $$\begin{bmatrix} X_{5i} \\ Y_{5i} \\ Z_{5i} \end{bmatrix} = Mcat_2 \cdot \begin{bmatrix} L_{4i} \\ M_{4i} \\ S_{4i} \end{bmatrix}$$

to obtain a second converted image, wherein $$\begin{bmatrix} X_{5i} \\ Y_{5i} \\ Z_{5i} \end{bmatrix}$$

are XYZ values of an i-th pixel of the second converted image in the XYZ color space, and $Mcat_2$ is a conversion matrix for conversion from an LMS color space to the XYZ color space;

converting the second converted image from the XYZ color space to the second color space based on a formula $$\begin{bmatrix} R_{6i} \\ G_{6i} \\ B_{6i} \end{bmatrix} = M_2 \times \begin{bmatrix} X_{5i} \\ Y_{5i} \\ Z_{5i} \end{bmatrix}$$

to obtain a third converted image, wherein $M_2$ is a conversion matrix for conversion from the XYZ color space to the second color space, and $$\begin{bmatrix} R_{6i} \\ G_{6i} \\ B_{6i} \end{bmatrix}$$

are RGB values of an i-th pixel of the third converted image in the second color space;

performing RGB color space image processing on the third converted image to obtain a fourth converted image;

converting the fourth converted image from the second color space to a YUV color space to obtain a fifth converted image; and performing YUV color space processing on the fifth converted image to obtain the target image.

17. The electronic device of claim 9, wherein performing second image processing on the second image based on the second parameter to obtain the target image comprises:

performing fifth image processing on the second image based on a formula $$\begin{bmatrix} R_{6i} \\ G_{6i} \\ B_{6i} \end{bmatrix} = CA_1 \times \begin{bmatrix} R_{2i} \\ G_{2i} \\ B_{2i} \end{bmatrix}$$

to obtain a third converted image, wherein $$\begin{bmatrix} R_{6i} \\ G_{6i} \\ B_{6i} \end{bmatrix}$$

are RGB values of an i-th pixel of the third converted image in the second color space, $$\begin{bmatrix} R_{2i} \\ G_{2i} \\ B_{2i} \end{bmatrix}$$

are RGB values of an i-th pixel of the second image in the second color space, and $CA_1$ is a target matrix;

performing RGB color space image processing on the third converted image to obtain a fourth converted image;

converting the fourth converted image from the second color space to a YUV color space to obtain a fifth converted image; and performing YUV color space processing on the fifth converted image to obtain the target image, wherein $CA_1 = M_2 \cdot Mcat_2 \cdot CA \cdot Mcat_1 \cdot M_1$, $M_1$ is a conversion matrix for conversion from the second color space to an XYZ color space, $M_2$ is a conversion matrix for conversion from the XYZ color space to the first color space, $Mcat_1$ is a conversion matrix for conversion from the XYZ color space to an LMS color space, $Mcat_2$ is a conversion matrix for conversion from the LMS color space to the XYZ color space, and CA is the second parameter.

18. A non-transitory computer-readable storage medium comprising instructions that, when executed by a processor of an electronic device, cause the electronic device to be configured to:

start a camera of the electronic device in response to a first operation;

acquire, by the camera, a first image under a first ambient light source in response to a second operation, wherein the first image is an image in a first color space, and the first ambient light source is at least one ambient light source for acquisition of the first image;

adjust the first image based on a formula $$\begin{bmatrix} R'_{1i} \\ G'_{1i} \\ B'_{1i} \end{bmatrix} = \begin{bmatrix} R_{gain} & 0 & 0 \\ 0 & 1 & 0 \\ 0 & 0 & B_{gain} \end{bmatrix} \cdot \begin{bmatrix} R_{1i} \\ G_{1i} \\ B_{1i} \end{bmatrix}$$

to obtain an adjusted first image, wherein $$\begin{bmatrix} R_{1i} \\ G_{1i} \\ B_{1i} \end{bmatrix}$$

are RGB values of an i-th pixel of the first image, $$\begin{bmatrix} R'_{1i} \\ G'_{1i} \\ B'_{1i} \end{bmatrix}$$

are RGB values of an i-th pixel of the adjusted first image, $R_{gain}=G/R$, $B_{gain}=G/B$, and R, G, and B are RGB values, respectively, of the first ambient light source in the first color space;

adjust the adjusted first image based on a formula $$\begin{bmatrix} R_{2i} \\ G_{2i} \\ B_{2i} \end{bmatrix} = CCM \cdot \begin{bmatrix} R'_{1i} \\ G'_{1i} \\ B'_{1i} \end{bmatrix}$$

to obtain a second image in a second color space, wherein CCM is a color correction matrix obtained based on a first parameter of the first ambient light source, and $$\begin{bmatrix} R_{2i} \\ G_{2i} \\ B_{2i} \end{bmatrix}$$

are RGB values of the i-th pixel of the second image in the second color space, wherein the second color space is different from the first color space;

obtain a second parameter based on the first parameter, wherein the second parameter is a parameter related to a third color space, the first parameter comprises a white balance parameter of the first ambient light source, the second parameter has a correspondence with the first parameter, the second parameter identifies light source information of the first ambient light source in the third color space, the third color space is different from the first color space, and the third color space is different from the second color space;

perform second image processing on the second image based on the second parameter to obtain a target image; and store the target image.

19. The non-transitory computer-readable storage medium of claim 18, wherein obtaining the second parameter based on the first parameter of the first ambient light source comprises:

calculating a degree D of chromatic adaptation based on the first parameter;

calculating, based on the first parameter, LMS values of a white point corresponding to the first ambient light source in the third color space;

calculating a gain matrix based on a formula $$M_{Gain1} = \begin{bmatrix} L_{dst}/L_{src} & 0 & 0 \\ 0 & M_{dst}/M_{src} & 0 \\ 0 & 0 & S_{dst}/S_{src} \end{bmatrix},$$

wherein $L_{dst}$, $M_{dst}$, and $S_{dst}$ are LMS values of a reference white point in the third color space, a light source corresponding to the reference white point is a reference light source, and the $L_{src}$, $M_{src}$, and $S_{src}$ values are the LMS values of the white point corresponding to the first ambient light source in the third color space;

calculating LMS values of a target white point in the third color space based on a formula $$\begin{bmatrix} L_{cur} \\ M_{cur} \\ S_{cur} \end{bmatrix} = (D \cdot M_{Gain1} + 1 - D) \times Mcat_1 \times \begin{bmatrix} X_{src} \\ Y_{src} \\ Z_{src} \end{bmatrix},$$

wherein a light source corresponding to the target white point is a target light source, $$\begin{bmatrix} X_{src} \\ Y_{src} \\ Z_{src} \end{bmatrix}$$

are XYZ values of the white point corresponding to the first ambient light source in an XYZ color space, $$\begin{bmatrix} X_{src} \\ Y_{src} \\ Z_{src} \end{bmatrix}$$

are obtained based on the $L_{src}$, $M_{src}$, and $S_{src}$ values, $Mcat_1$ is a conversion matrix for conversion from the XYZ color space to an LMS color space, and $$\begin{bmatrix} L_{cur} \\ M_{cur} \\ S_{cur} \end{bmatrix}$$

are the LMS values of the target white point in the third color space; and
    calculating the second parameter based on a formula $$CA = \begin{bmatrix} L_{cur}/L_{dst} & 0 & 0 \\ 0 & M_{cur}/M_{dst} & 0 \\ 0 & 0 & S_{cur}/S_{dst} \end{bmatrix},$$

wherein CA is the second parameter.

20. The non-transitory computer-readable storage medium of claim 18, wherein performing second image processing on the second image based on the second parameter to obtain the target image comprises:
    performing third image processing on the second image to obtain a third image;
    performing chromatic adaptation processing on the third image based on a formula $$\begin{bmatrix} L_{4i} \\ M_{4i} \\ S_{4i} \end{bmatrix} = CA \cdot \begin{bmatrix} L_{3i} \\ M_{3i} \\ S_{3i} \end{bmatrix}$$

to obtain a fourth image, wherein CA is the second parameter $$\begin{bmatrix} L_{3i} \\ M_{3i} \\ S_{3i} \end{bmatrix}$$

are LMS values of the third image in the third color space, and $$\begin{bmatrix} L_{4i} \\ M_{4i} \\ S_{4i} \end{bmatrix}$$

are LMS values of the fourth image in the third color space; and
    performing fourth image processing on the fourth image to obtain the target image.

* * * * *